US012624243B2

(12) United States Patent
Zhou et al.

(10) Patent No.: US 12,624,243 B2
(45) Date of Patent: May 12, 2026

(54) GRAFT POLYURETHANE COPOLYMER DISPERSIONS

(71) Applicant: Hewlett-Packard Development Company, L.P., Spring, TX (US)

(72) Inventors: Zhang-Lin Zhou, San Diego, CA (US); Yubai Bi, San Diego, CA (US); Qianhan Yang, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 896 days.

(21) Appl. No.: 17/642,718

(22) PCT Filed: Jan. 10, 2020

(86) PCT No.: PCT/US2020/013029

§ 371 (c)(1),
(2) Date: Mar. 14, 2022

(87) PCT Pub. No.: WO2021/141594

PCT Pub. Date: Jul. 15, 2021

(65) Prior Publication Data

US 2022/0332971 A1 Oct. 20, 2022

(51) Int. Cl.

| | |
|---|---|
| ***C09D 175/04*** | (2006.01) |
| ***C08L 33/10*** | (2006.01) |
| ***C08L 75/04*** | (2006.01) |
| ***C09D 11/322*** | (2014.01) |

(52) U.S. Cl.

CPC ............ *C09D 175/04* (2013.01); *C08L 33/10* (2013.01); *C08L 75/04* (2013.01); *C09D 11/322* (2013.01); *C08L 2201/54* (2013.01)

(58) Field of Classification Search

None

See application file for complete search history.

(56) References Cited

U.S. PATENT DOCUMENTS

| | | | | |
|---|---|---|---|---|
| 5,608,000 | A | 3/1997 | Duan et al. | |
| 7,425,062 | B2 | 9/2008 | Bauer | |
| 9,090,734 | B2 | 7/2015 | Kraiter et al. | |
| 9,199,270 | B2 | 12/2015 | Steinmetz et al. | |
| 2011/0014439 | A1 | 1/2011 | Joshi et al. | |
| 2011/0020549 | A1 * | 1/2011 | Comert | C08G 18/12 427/373 |
| 2016/0215157 | A1 * | 7/2016 | Kakikawa | C08K 5/3417 |
| 2018/0016384 | A1 * | 1/2018 | Chen | C08G 18/6245 |
| 2018/0179325 | A1 | 6/2018 | Chen et al. | |
| 2019/0270899 | A1 * | 9/2019 | Chen | C09D 11/322 |
| 2019/0367756 | A1 | 12/2019 | Abelovski et al. | |
| 2020/0062979 | A1 * | 2/2020 | Chen | C08G 18/44 |

FOREIGN PATENT DOCUMENTS

| | | |
|---|---|---|
| CN | 109863213 | 6/2019 |
| WO | 2018182568 | 10/2018 |
| WO | 2019074683 | 4/2019 |

* cited by examiner

*Primary Examiner* — Randy P Gulakowski
*Assistant Examiner* — Holley Grace Hester
(74) *Attorney, Agent, or Firm* — Dierker & Kavanaugh, P.C.

(57) ABSTRACT

A graft polyurethane copolymer dispersion can include dispersed polyurethane particles including a graft polyurethane copolymer. The graft polyurethane copolymer in this example includes a polyurethane backbone, a graft side-chain polymer attached to the polyurethane backbone, sulfonic acid groups, and isocyanate-generated amines. The graft side-chain polymer can include a poly(meth)acrylic moieties with C1 to C12 alkyl pendant groups, polyalkylene oxide pendant groups, or a combination thereof.

17 Claims, 3 Drawing Sheets

GRAFT POLYURETHANE COPOLYMER DISPERSIONS

BACKGROUND

Inkjet printing has become a popular way of recording images on various types of media. Some of the reasons include low printer noise, variable content recording, capability of high-speed recording, and multi-color recording. These advantages can be obtained at a relatively low price to consumers. As the popularity of inkjet printing increases, the types of uses also increase providing demand for new ink compositions and applications. For example, there is a wide variety of packaging applications that could benefit from the use of ink compositions having good durability when printed thereon.

DETAILED DESCRIPTION

Figure 1A:
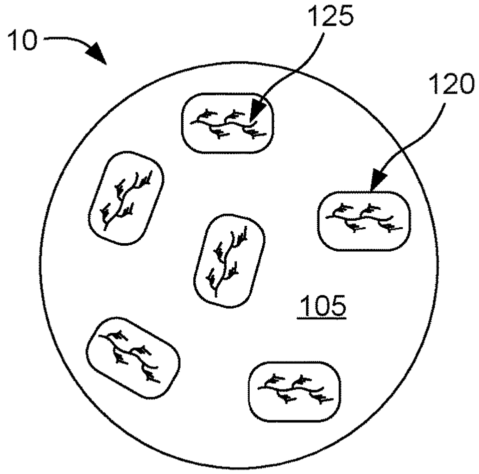
FIG. 1A schematically illustrates an example graft polyurethane copolymer dispersion in accordance with the present disclosure.

Printing for packaging can present some challenges that may not be present when printing on standard papers or other print media. For example, the size and/or dimensions of packaging; packaging color, e.g., dark colors; packaging translucency, e.g., transparent substrate may be assisted by application of white base for printing; packaging configuration, e.g., flexible, corrugated, foldable, etc.; packaging conditions, e.g., heat, pressure, etc.; and the like can present different challenges when printing indicia thereon. Enhancing print durability on a variety of packaging applications can thus provide a versatile printing solution across a wide swath of packaging applications, and in the case of inkjet printing applications, providing good durability while retaining reliable printing characteristics would be useful.

In accordance with an example of the present disclosure, a graft polyurethane copolymer dispersion includes dispersed polyurethane particles including a graft polyurethane copolymer including a polyurethane backbone, a graft side-chain polymer attached to the polyurethane backbone, sulfonic acid groups, and isocyanate-generated amines. The graft side-chain polymer in this example includes a poly(meth) acrylic moieties with C1 to C12 alkyl pendant groups, polyalkylene oxide pendant groups, or a combination thereof. In one example, the graft polyurethane copolymer can be devoid of carboxylic acid. In another example, when the graft polyurethane copolymer includes carboxylic acid groups, the carboxylic acid groups are are present at a molar ratio of sulfonic acid groups to carboxylic acid groups of 2:1 or more, e.g., as the ratio increases, the carboxylic acid molar concentration is reduced relative to the sulfonic acid molar concentration. The graft side-chain polymer can be attached to the polyurethane backbone via a sulfur-containing linking group. In further detail, the polyurethane backbone can include a reaction product of polyisocyanates with polycarbonate polyols or polyether polyols, e.g., an isophorone diisocyanate, in addition to graft side-chain polymeric diols used to generate the graft side-chain polymer. The polyurethane backbone can include a reaction product of polyisocyanates with polyols, wherein the isocyanate-generated amines are generated from a 10 wt % to 25 wt % molar excess of the isocyanate groups provided by polyisocyanates relative to hydroxyl groups provided by the polyols.

In another example, the graft polyurethane copolymer dispersion is in the form of an ink composition. The ink composition in this example includes a pigment, an ink vehicle including water and organic co-solvent, and from 1 wt % to 15 wt % of the polyurethane particles with the graft polyurethane copolymer based on the total weight of the ink composition. The graft polyurethane copolymer in this example includes a polyurethane backbone, a graft side-chain polymer attached to the polyurethane backbone, wherein the graft side-chain polymer includes a poly(meth) acrylic moieties with C1 to C12 alkyl pendant groups, polyalkylene oxide pendant groups, or a combination thereof, sulfonic acid groups, and isocyanate-generated amines.

In another example, a multi-fluid kit for imaging includes an ink composition and a second fluid composition. The ink composition, for example, includes a pigment, an ink vehicle including water and organic co-solvent, and from 1 wt % to 15 wt % polyurethane particles based on the total weight of the ink composition. The polyurethane particles in this example include a graft polyurethane copolymer with a polyurethane backbone, a graft side-chain polymer attached to the polyurethane backbone, sulfonic acid groups, and isocyanate-generated amines. The graft side-chain polymer includes a poly(meth)acrylic moieties with C1 to C12 alkyl pendant groups, polyalkylene oxide pendant groups, or a combination thereof. In one specific example, the secondary fluid composition can be a second ink composition comprising a second pigment colorant of a different color than the pigment colorant. In further detail, the secondary fluid can also include the polyurethane particles, which include the graft polyurethane copolymer. In another example, the secondary fluid composition can be a fixer composition including a cationic compound.

In another example, a method of printing includes ejecting an ink composition onto a media substrate. The ink composition in this example includes a pigment, an ink vehicle including water and organic co-solvent, and from 1 wt % to 15 wt % polyurethane particles based on the total weight of the ink composition. The polyurethane particles in this example include a graft polyurethane copolymer with a polyurethane backbone, a graft side-chain polymer attached to the polyurethane backbone, sulfonic acid groups, and isocyanate-generated amines. The graft side-chain polymer in this example includes a poly(meth)acrylic moieties with C1 to C12 alkyl pendant groups, polyalkylene oxide pendant groups, or a combination thereof. In one example, the graft polyurethane copolymer can be devoid of carboxylic acid, or if carboxylic acid is included, a molar concentration of sulfonic acid groups to carboxylic acid groups is from 2:1 or more, e.g., 2:1 to 50:1. In another example, the method can include ejecting a fixer composition including a cationic compound on the media substrate prior to ejecting the ink composition thereon.

It is noted that when discussing the graft polyurethane copolymer dispersions, multi-fluid kits for imaging, and methods of printing herein, these discussions can be considered applicable to one another whether or not they are explicitly discussed in the context of that example. Thus, for example, when discussing a polyol, for example, in the context of the graft polyurethane copolymer dispersion, such disclosure is also relevant to and directly supported in the context of the multi-fluid kits and the methods of printing, and vice versa.

Graft Polyurethane Copolymer Dispersions

Reference is now made to FIG. 1A, which schematically depicts a graft polyurethane copolymer dispersion 10 of a dispersion vehicle 105 and polyurethane particles 120 that include graft polyurethane copolymer 125. The dispersion vehicle is the liquid medium that provides a continuous fluid for suspension of the polyurethane particles, and can be water, or may include water and other components, e.g., surfactant(s), organic co-solvent, antimicrobial agent, etc.

In examples herein, the graft polyurethane copolymer can be prepared by reacting a polyisocyanate, e.g., such as a diisocyanate, with a polyol (or multiple polyols) to form a pre-polymer, for example. The polyol can react with the polyisocyanate to contribute to the formation of a polyurethane chain or "polyurethane backbone." Since the polyurethane particles include a graft polyurethane copolymer, one of the polyols can be a polyol that includes the "graft" polymer side chain, and thus, can be included when forming the pre-polymer. In examples herein, the copolymer that results is a polyurethane backbone with graft side-chain polymers providing a second type of polymer attached to the polyurethane backbone. In this configuration, the graft polyurethane copolymer can be described as having a "comb-like" structure with a main chain (e.g., backbone or "comb handle") with side chains (e.g., "comb teeth") grafted to the main chain. In certain examples, the side-chain polymers may also include pendant groups extending therefrom, as shown by way of example in Formula II and by particular example in Formula III.

For clarity, the term "polyol" indicates that the compound includes multiple hydroxyl groups, e.g., 2 or more hydroxyl groups. However, there are multiple different "polyols" that are described herein in the context of preparation of the graft polyurethane copolymers described herein. In one example, there can be "polyols" used for three (3) different purposes in preparing the graft polyurethane copolymers described herein. First and second, there can be polyols of two types used in preparing the graft side-chain polymer itself (in preparation for being grafted onto the polyurethane backbone during polyurethane backbone polymerization). In this context, the first polyol used can be that which is used to form the graft side-chain polymer, typically with repeating units, and can be a polycarbonate polyol and/or a polyester polyol. Furthermore, the second polyol used can be that which is used to attach to a terminal end of the graft side-chain polymer to itself to become a polyol that ultimately is used in the polyurethane backbone polymerization reaction. An example of this second type of polyol is a thioglycerol. In other words, this second type of polyol can become the terminal diol used to form the polyurethane backbone. Third, there are polyols that may be used to form the polyurethane pre-polymer. In other words, these polyols react with polyisocyanates to form the polyurethane backbone, and may include any of a number of polyols, e.g., polyether polyols, polyester polyols, polyester ether polyols, polycarbonate polyols, C2 to C16 aliphatic nonionic polyol, etc., if present. It is noted that one of the polyols that is present in forming the graft polyurethane copolymer is the polyol that is formed using the first and second type of polyol to be grafted along the polyurethane backbone.

The term "poly" in this context of "polyol" does not specifically infer that the compound is a polymer, but the polyol may be a polymeric polyol in some examples. In many instances, the polyol can be a diol, which may be a polymeric diol, oligomeric diol, or a small molecule diol, for example.

With specific reference to the polyols that can be used to form the polyurethane backbone (in addition to the graft side-chain polymer polyol that is also used to attach the graft side-chain polymer along the polyurethane backbone), any of a number of such polyols can be used. For example, there are polymeric diols as well as small molecular diols that can be used in preparing the polyurethane particles of the present disclosure. Example polymeric diols include polyester diols, polycarbonate diols, polyether diols, or combinations of these diols, e.g., polycarbonate ester polyether-type polyurethane. Example polyether polyols that may be used include ethylene glycols, polyethylene glycols, propylene glycols, polypropylene glycols, polyethylene-polypropylene glycols, or the like. With respect to the polycarbonate polyols, many different polycarbonate polyols can be selected for use, such as hexanediol-based polycarbonate diol, pentanediol-based polycarbonate diol, and/or hybrid hexanediol- and pentanediol-based polycarbonate diol, for example. Several commercially available polycarbonate polyols that can be used may include those available from Kuraray Co., Ltd. (Japan), such as C-590, C-1090, C-2090, the like, or combinations thereof. The molecular weight (or weight average molecular weight as may be applicable) of these or other polyols that can be used, for example, can be from 400 Mw to 3500 Mw, from 500 Mw to 3000 Mw, from 500 Mw to 2700 Mw, from 700 Mw to 1500 Mw, or from 800 Mw to 2000 Mw, for example. On the other hand, small molecule polyols can have lower molecular weights, such as carboxylated polyols, certain glycerols, or the like. In one example, there may be nonionic aliphatic diols included, e.g., diols with aliphatic groups having total atomic mass up to about 300 or as defined as having from 2 to 16 carbon atoms. Examples of nonionic aliphatic diols that can be used include various alkyl and/or alicyclic diols, which may be C2 to C16 straight-chained alkyl diols, C3 to C16 branched alkyl diols, C6 to C16 alicyclic diols (which may include alicyclic rings and alkyl chains), etc.

Referring now to the polyisocyanates that can be used to prepare the pre-polymer, e.g., react with the polyols to form the polyurethane backbone, examples include 2,2,4 (or 2, 4, 4)-trimethylhexane-1,6-diisocyanate (TMDI), hexamethylene diisocyanate (HU), methylene diphenyl diisocyanate (MDI), isophorone diisocyanate (IPDI), and/or 1-Isocyanato-4-[(4-isocyanatocyclohexyl)methyl]cyclohexane (H12MDI), etc., or combinations thereof, as shown below in Table 1.

TABLE 1

| Chemical Structure |
| --- |
| 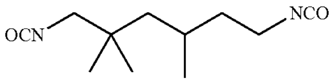 |
| 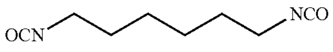 HDI |
| 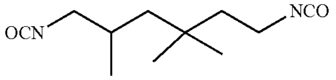 TMDI |
| 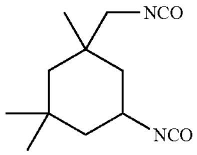 IPDI |
| 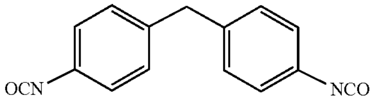 MDI |
| 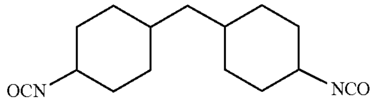 H122MDI |

Others can likewise be used alone, or in combination with these diisocyanates, or in combination with other diisocyanates, e.g., aromatic polyisocyanate such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and/or naphthalene diisocyanate, aliphatic polyisocyanates and polyisocyanates having an alicyclic structure, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, etc.

Thus, a polyurethane pre-polymer can be formed by reacting the polyisocyanates with the polyols (including the graft side-chain polymer polyol) with excess isocyanate groups in anhydrous conditions to avoid self-crosslinking of isocyanate-generated amines at this stage. The reaction can occur, for example, in the presence of a catalyst in acetone under reflux to give the pre-polymer. By retaining excess isocyanate groups, once in the presence of water, the isocyanate groups can generate amino groups or secondary amines along the polyurethane chain, releasing carbon dioxide as a byproduct. The sulfonic acid or sulfonate group can furthermore be added by reacting a sulfonated diamine to the polyurethane pre-polymer to generate the sulfonic acid groups. In some examples, water can be added to the polyurethane pre-polymer and allow for self-crosslinking (within a single strand or from strand to strand) at about the same time that the sulfonate diamines are added. Thus, the polyurethane particles (dispersed in a dispersion vehicle) can be formed that include a polyurethane backbone, a graft side-chain polymer attached to the polyurethane backbone, sulfonic acid groups, and isocyanate-generated amines with self-crosslinking in some examples. The isocyanate-generated amines can be in the form of self-crosslinked groups or crosslinkable amine groups available for crosslinking. In accordance with examples herein, the graft side-chain polymer can include poly(meth)acrylic moieties with C1 to C12 alkyl pendant groups (formed from polycarbonate diols), poly(meth)acrylic moieties with polyalkylene oxide pendant groups (formed from polyester diols), or a combination thereof.

As mentioned, the graft polyurethane copolymers described herein include sulfonic acid groups, e.g., end cap groups or crosslinker groups (provided by sulfonated amines or sulfonated diamines), which can act as hydrophilic or anionic groups for stability. In some examples, there may also be carboxylic acid groups, provided they are present at a lower molar concentration than the sulfonic acid groups, e.g., sulfonic acid to carboxylic acid molar ratio of 2:1 or more. As a note the term "sulfonic acid" includes sulfonate groups, and the term carboxylic acid includes carboxylate groups, either of which can be present in equilibrium as a matter of pH, e.g., more basic pH favors the salt over the acid form. Thus, as an example, the term "sulfonic acid" includes either or both of the acid form and the salt form being present, which typically exist in equilibrium based on pH.

The sulfonic acid groups can be appended to the polyurethane pre-polymer, as mentioned, along the polymer chain as a side group or as end cap groups. In one example, the sulfonic acid can be added using a sulfonic acid diamine, such as an alkylamine-alkylamine sulfonate (shown as a sulfonic acid, but as a sulfonate, would include a positive counterion associated with an $SO_3^-$ group), though there are others, including other alkyl diamines sulfonates, alkyl diamine carboxylates, alicyclic diamine sulfonates, alicyclic diamine carboxylates, aromatic diamine sulfonates, aromatic diamine carboxylates, or combinations thereof. Thus, the alkyl diamine sulfonic acid (or sulfonate) shown in Formula I is below is provided by way of example, as follows:

Formula I

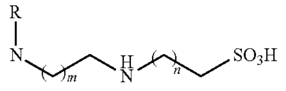

where R is H or is C1 to C10 straight- or branched-alkyl or alicyclic or combination of alkyl and alicyclic, m is 1 to 5, and n is 1 to 5. One example of such a structure sold by Evonik Industries (USA) is sodium 2-[(2-aminoethyl) amino]ethanesulfonate, which is exemplified where R is H, m is 1, and n is 1 or 2.

In some examples, the graft polyurethane copolymer can be devoid of carboxyl groups, or if present, can be included at a molar concentration less than two times that of the sulfonic acid groups. For example, if there are carboxyl groups present, e.g., carboxylates, carboxylic acids, etc., the molar ratio of sulfonic acid groups to carboxyl groups can be 2:1 or more, e.g., from 2:1 to 50:1, from 2:1 to 20:2, from 4:1 to 20:1, from 6:1 to 20:1, or from 8:1 to 20:1.

An example preparation scheme is shown in Table 2, which sets forth various steps in one example sequence, as follows:

TABLE 2

| | Step | |
|---|---|---|
| 1 | Initial Reactants | Diisocyanate + Graft Side-chain Polymeric Diol + Catalyst/Acetone → |
| 2 | Pre-polymer | Formation Polyurethane Backbone Including Excess Isocyanate Groups and Urethane Linkages Generated From Graft Side-chain Polymeric Diols (and any other polyols that may be present) |
| 3 | Sulfonic Acid-Diamine Reactant | Sulfonic Acid-Diamine Groups → |
| 4 | Acidified Polymer | Intermediate Polymer Modified with Sulfonic Acid-Diamine Groups with Graft Side-chain Polymer and Excess Isocyanate Groups |
| 5 | Aqueous Dispersion | Water (Remove Acetone) → |
| 6 | Polyurethane Particles Dispersed in Water | Polyurethane Particle Dispersion Including Sulfonic Acid-Diamine Groups, Graft Side-chain Polymer, and Crosslinked Isocyanate-Generated Amine Groups |

The graft side-chain polymeric diol can be a polyacrylic chain including (meth)acrylic-attached pendant groups, such as C1 to C12 alkyl, polyethylene, polypropylene, or a combination thereof, for example. The polyacrylic chain can be modified at an end thereof with a functional diol group that can be attached thereto, such as thioglycerol, for example. The graft side-chain polymeric diol can have a weight average molecular weight from about 1,000 Mw to 20,000 Mw, from 1,200 Mw to 15,000 Mw, or from 1,500 Mw to 10,000 Mw, for example.

As mentioned, there can be other components included as well, such as other polymeric diols, carboxylic acid-containing diols (at a lower molar ratio than the sulfonic acid groups), nonionic diols, chain extenders, crosslinking groups (in addition to the isocyanate-generated amines), etc. for example, If a chain extender is present, reaction between the various polyols and the polyisocyanate can be charged in water, and a chain extender may be added for interaction with the graft polyurethane copolymer. The chain extender can be a polyamine, e.g., a diamine such as ethylenediamine. Other examples can include 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine, N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, triethylenetetramine, hydrazine, N,N'-dimethylhydrazine, 1,6-hexamethylenebishydrazine, succinic acid dihydrazide, adipic acid dihydrazide, glutaric acid dihydrazide, sebacic acid dihydrazide, and isophthalic acid dihydrazide, β-semicarbazide propionic acid hydrazide, 3-semicarbazide-propyl-carbazate, and/or semicarbazide-3-semicarbazidemethyl-3,5,5-trimethylcyclohexane. Among these, ethylenediamine can be used. The chain extender can alternatively be a glycol and/or a phenol. The chain extender can be added at an equivalent ratio of chain extender amino groups in the polyamine to excess isocyanate groups at of the graft polyurethane copolymer can be 1.9 or less, or 1 or less, for example.

Once formed, the graft polyurethane copolymer can, for example, have a weight-average molecular weight when formed ranging from 10,000 Mw to 150,000 Mw, though molecular weights outside of this range can also be used in some examples. In the context of thermal inkjet printing, a weight average molecular weight from 10,000 Mw to 100,000 Mw, or from 15,000 Mw to 50,000 Mw can be a practical range to consider in formulating the ink compositions with low organic co-solvent content as described herein.

As one example, a chemical process for making the graft side-chain polymeric diols (to be grafted along the polyurethane backbone in a later reaction) can include the reaction of thioglycerol with (meth)acrylate monomers. In this example, as shown in Formula II as follows, there is one methacrylate monomer and two acrylate monomers shown as being part of the reaction, but this is provided by way of example, as there could be one or multiple acrylate monomers and/or one or multiple methacrylate monomers. The monomers can then be reacted in a solvent with heat to give the graft side-chain polymeric polyol shown below as the reaction product.

Formula II

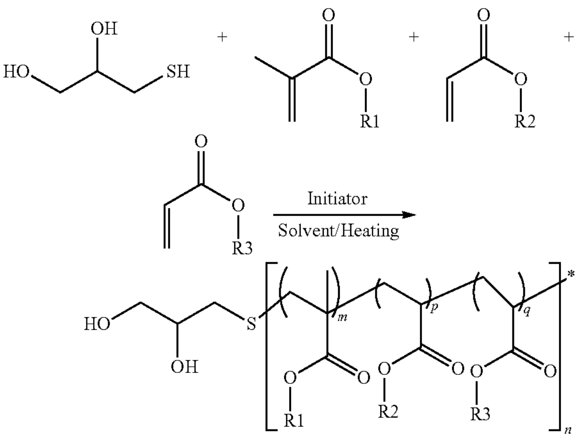

where R1, R2, and R3 can independently be from C1 to C12, ethoxyalkyl, polyethoxyalkyl, propoxy alkyl, polypropoxyalkyl, ethoxypropoxyalkyl, polyethoxypropoxyalkyl, polyprooxyethoxyalkyl, polyethoxypolypropoxyalkyl, or the like, where alkyl can be from C1 to C12, for example; m, p, and q can independently be from 1 to 100, with the proviso that m+p+q is from 10 to 300; and n is from 1 to 50. In one example two of m, p, and q are present. In another example, all three of m, p, and q are present. In another example, R1 or R2 is C1 to C3 alkyl and R3 includes an ethoxy.

In more specific detail, in Formula III below, three specific (meth)acrylate monomers are shown as being chosen. Specifically, the graft side-chain polymeric diol in this example is prepared from thioglycerol (to form the diol end group for polymerization into the polyurethane backbone), methyl methacrylate (where R1 is a methyl group), 2-ethylhexyl acylate (where R2 is 2-ethylhexyl group), and 2-(2-ethoxyethoxy)ethyl acrylate (where R3 is an ethoxyethoxyethyl group) in the presence of an initiator in a solvent under heating. The resultant example structure is a graft side-chain polymeric polyol prepared in accordance with the present disclosure that can be grafted onto a polyurethane backbone of a graft polyurethane copolymer.

Formula III

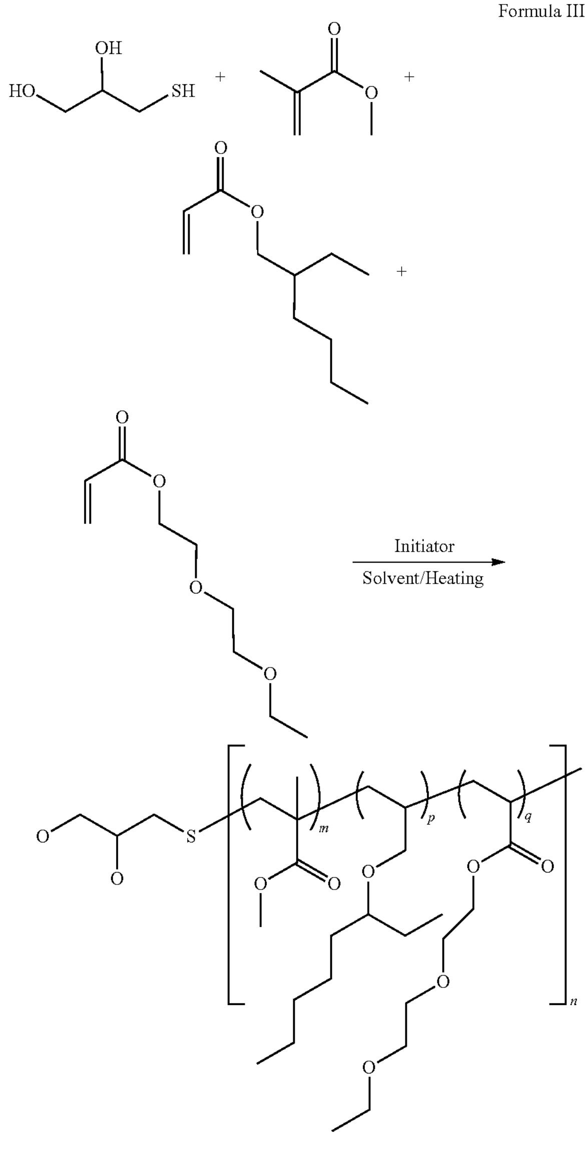

where m, p, q, and n are as described in Formula II.

Figure 1B:
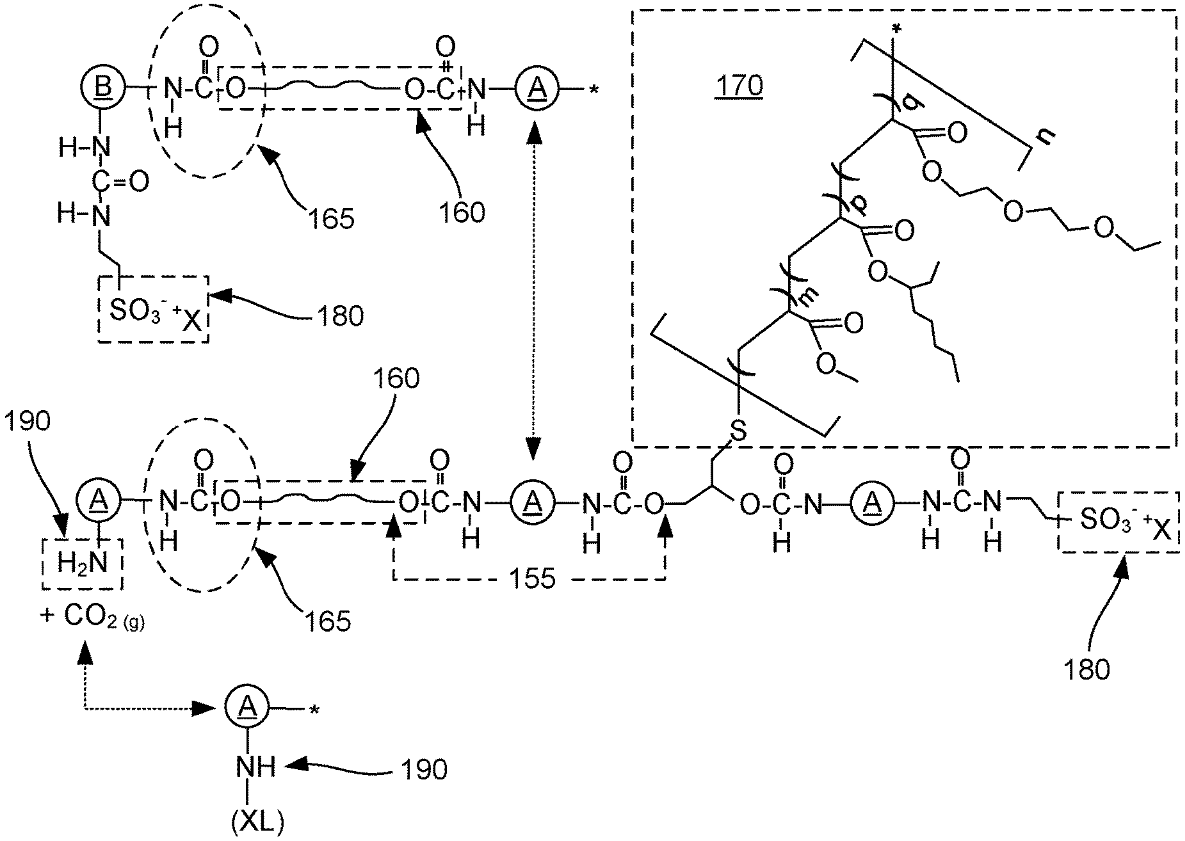
FIG. 1B schematically illustrates various example chemical groups that can be present on the graft polyurethane copolymers of the example polyurethane particles in accordance with the present disclosure.
Figure 2:
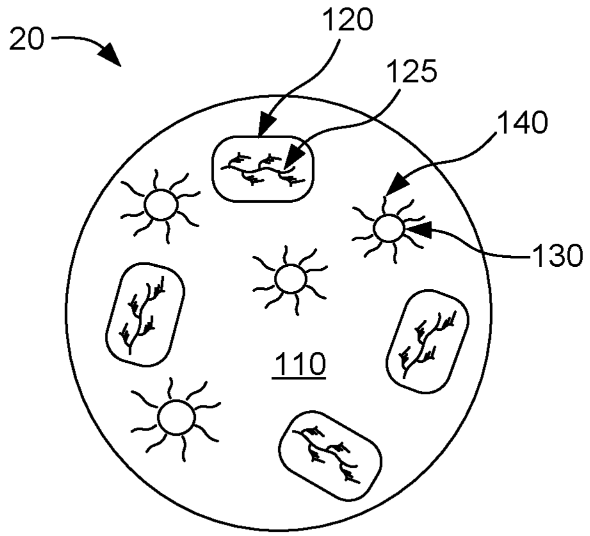
FIG. 2 schematically illustrates an example graft polyurethane copolymer dispersion in the form of an ink composition in accordance with the present disclosure.

FIG. 1B provides some additional example detail regarding the structure of the graft polyurethane copolymer that can be included in the polyurethane particles of the present disclosure. As previously noted, the polyurethane particles can be dispersed in a graft polyurethane copolymer dispersion, such as that shown in FIG. 1A, but alternatively, the graft polyurethane copolymer dispersion can be formulated into the form on an ink composition, as shown in FIG. 2 schematically hereinafter.

With this in mind, FIG. 1B schematically shows example portions of graft polyurethane copolymers that can be present in the dispersed polyurethane particles, for example, as prepared in accordance with the preparative scheme of Table 2, or as shown in Formulas II or III, or by any other suitable reaction scheme. Alternative groups are shown by dotted bidirectional arrows by way of example. It is noted that this schematic FIG. is to provide an understanding of the types of groups that may be present, and should not be considered limiting as to specific group choices shown; polyurethane backbone chain length; graft side-chain configuration, length, or frequency; weight average molecular weight; selection or ratio of copolymerized monomers, etc. Furthermore, this FIG. does not specifically show the cross-linking of the isocyanate-generated amines 190 to other polyurethanes or to other components that may be present in the various dispersions described herein, but rather schematically shows an alternative variation of an amine as being associated with a group notated as "XL," indicating that crosslinking may be present at this or any other location where there is an isocyanate generated amine present due to excess isocyanate groups relative to hydroxyl groups provided by various polyols. Furthermore, the isocyanate-generated amines may be present at the ends of the polyurethane backbone, or may act to provide chain extension with other polyurethanes. These types of crosslinkable groups may alternatively or additionally be present in some examples along the polyurethane backbone as pendant groups therefrom, or may extend from side chain groups, depending on the polymer configuration prepared.

In further detail, as shown schematically in FIG. 1B, a graft polyurethane copolymer can include a polyurethane backbone, show as formed by urethane linkages 165 between any of a number of polyols 160, e.g., polymeric diols, diols from the graft side-chain polymer 170, etc., and any of a number of polyisocyanates 155. Regarding the graft side-chain polymer, m, p, q, and n can be as previously described in Formulas II and III, for example. Notably, the polyols and isocyanates in this FIG. are shown in their polymerized state forming the polyurethane backbone, and not in their original hydroxyl- or isocyanate-containing state prior to polymerization. For example, the polymerized polyols liberate hydrogens at their hydroxyl moieties to form the urethane linkage groups in some locations. In other words, the polymerized diisocyanates, which include urethane linkage groups on either side of a central moiety, with the central moiety depicted as a circle with an "A" therein, are shown schematically. The central moiety of the polymerized diisocyanates may be provided from any of the diisocyanates shown and/or described herein, or any of a number of other diisocyanates, or can also be representative of multiple different types of diisocyanates used in combination. Thus, the central moieties (shown as a circle) from the diisocyanates can actually be different at the various locations where this central moiety, or circle, is shown In further detail, the graft polyurethane copolymer in this example includes sulfonic acid groups 180 (or sulfonated-diamines, as shown, having a cationic counterion, X, where X can be a cationic metal, such as sodium, lithium, potassium, etc., or other cationic counterion, e.g., cationic oligomer, ammonium, etc.

There can also be other types of compounds included in the polymerized polyurethane particles beyond that which is shown in FIG. 1B. For example, one of the polyurethane particle portions can include a polymerized organic acid diol (not shown), which can be generated from an organic acid diol, e.g., 2,2-bis(hydroxymethyl)propionic acid in this instance. This can be added when generating the pre-polymer with the other diols, for example. If an organic acid diol is used, it can be used in addition to the sulfonic acid moieties, and can be included at a lower molar concentration relative to the sulfonic acid moieties, as previously described.

As mentioned, there can also be isocyanate-generated amino groups 190 that can be generated from any excess isocyanate groups, such as those not otherwise used for other types of polymerization, e.g., appending sulfonic acids, attaching graft side-chain polymer or copolymerizing other diols along the polyurethane backbone, etc. Thus, in examples of the present disclosure, the polyurethane polymer can be self-crosslinked and/or self-crosslinkable such as from isocyanate-generated amines, can include a sulfonated-diamine (and in some instances a carboxylated diamine at a lower molar concentration than the sulfonated diamine), and can include any of a number of copolymerized diols including the copolymerized graft side-chain polymeric diol. In some examples, it is noted that the isocyanate-generated amine group shown can further react with isocyanates to form additional urethane bonds for crosslinking reactions. However, there can also be amino groups or secondary amines present that remain available for additional cross-linking to print media substrates, printed ink components, etc.

Ink Compositions

Referring now to FIG. 2, an ink composition 20 is a more specific type of graft polyurethane copolymer dispersion that can be prepared. The ink composition can include, for example, an ink vehicle 110 and polyurethane particles 120 that include a graft polyurethane copolymer 125, as previously described. The ink composition, however, can further include pigment 230, such as an inorganic or organic pigment colorant, which can be dispersed by a dispersant 240, for example.

In further detail regarding the ink vehicle, as the ink composition can be an aqueous ink composition, water can be a major solvent and can make up a relatively large portion of the ink composition. e.g., from 30 wt % to 75 wt %, from 35 wt % to 60 wt %, from 30 wt % to 50 wt %, or from 35 wt % to 50 wt %, based on a total weight of the ink composition. As a note, when reciting weight percentages (wt %) herein, unless the context is otherwise clear, these percentages are based on the ink composition as a whole. In some examples, the water can be deionized, purified, or a combination of purified and deionized.

In further detail, the ink vehicle can include an organic co-solvent. Classes of co-solvents that may be used can include organic co-solvents, including alcohols (e.g., aliphatic alcohols, aromatic alcohols, polyhydric alcohols (e.g., diols), polyhydric alcohol derivatives, long chain alcohols, etc.), glycol ethers, polyglycol ethers, a nitrogen-containing solvent (e.g., pyrrolidinones, caprolactams, formamides, acetamides, etc.), and a sulfur-containing solvent. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs (C6-C12) of polyethylene glycol alkyl ethers, N-alkyl caprolactams, unsubstituted caprolactams, both substituted and unsubstituted formamides, both substituted and unsubstituted acetamides, and the like. Still other examples of suitable co-solvents include propylene carbonate and ethylene carbonate. In certain examples, the organic co-solvent can include glycols, such as tripropylene glycol, triethylene glycol, etc.; glycol ethers, such as DOWANOL™ TPM (dipropylene glycol methyl ethers); polyglycol ethers; ethyoxylates of glycerol, such as LIPONIC™ Eg-1 (LEG-1); lactams, such as 2-pyrrolidinone, N-(2-hydroxyethyl)-2-pyrrolidinone, 5,5-dimethyl hydantoin, etc.; di-(2-hydroxyethy)-5,5-dimethylhydantoin, etc.; alkyl diols, such as ethylhydroxy propanediol; caprolactams, formamides, acetamides, long chain alcohols, or mixtures thereof.

The organic co-solvent can further be in the form of a humectant. Examples include, some of which overlap with those described previously, glycols such as 2,2'-thiodiethanol, glycerol, 1,3-propanediol, 1,5-pentanediol, polyethylene glycol, ethylene glycol, diethylene glycol, propylene glycol and tetraethylene glycol; pyrrolidones such as 2-pyrrolidone; N-methyl-2-pyrrolidone; N-methyl-2-oxazolidinone; and/or monoalcohols such as n-propanol and isopropanol. More specific examples may include 2,2'-thiodiethanol, glycerol, 1,3-propanediol, 1,5-pentanediol, polyethylene glycol, ethylene glycol, diethylene glycol, propylene glycol, tetraethylene glycol, 2-pyrrolidone, n-propanol and mixtures thereof.

Other organic co-solvents can likewise be used, particularly when included to enhance printhead performance, image quality, print durability, etc. For example, in some examples, the organic co-solvent can include a hydrophilic organic co-solvent to assist with reducing incidence of nozzle blockage, and can contribute to nozzle health, and in some examples, improved decap performance.

The organic co-solvent can be present in the ink composition at from 4 wt % to 25 wt %, from 5 wt % to 20 wt %, from 5 wt % to 15 wt %, or from 7 wt % to 15 wt %, for example. Notably, when referring to the organic co-solvent in the ink compositions, ink sets, and methods described herein, it is noted that the organic co-solvent concentration ranges provided refer to a total organic co-solvent content, e.g., cumulative of all organic co-solvent added to the other ink vehicle components in the ink composition. Other additives such as surfactant, polymer, oligomer, polyurethane particles, salts, emulsifiers, etc., are not counted as "organic co-solvents."

The choice of pigment is not particularly limited and can include both inorganic pigments, such as carbon black, as well as organic pigments, such as many of the colored pigments that are commercially available. The particular pigment used will depend on the color properties to be generated by the colorist in creating the ink composition. Pigment colorants can include black, cyan, magenta, yellow, red, blue, orange, violet, green, blue, pink, etc. In one example the pigment can be a cyan pigment, a magenta pigment, a yellow pigment, or a combination thereof. In another example, the pigment can be a green pigment, an orange pigment, a violet pigment, or a combination thereof. It is noted that ink compositions can include more than one pigment, such as a red ink containing magenta and yellow pigment, or a magenta ink with magenta pigment and a small amount of yellow pigment to adjust the color properties (hue angle), etc. In still other examples, an ink set may include one or more ink compositions as described herein, and other ink compositions of the ink set may be outside the scope of the claimed ink compositions set forth herein.

In further detail, suitable pigments can include, for example, carbon black pigments, azo pigments including diazo pigments and monoazo pigments; polycyclic pigments (e.g., phthalocyanine pigments such as phthalocyanine blues and phthalocyanine greens, perylene pigments, perinone pigments, anthraquinone pigments, quinacridone pigments, dioxazine pigments, thioindigo pigments, isoindolinone pigments, pyranthrone pigments, and quinophthalone pigments); nitro pigments; nitroso pigments; anthanthrone pigments; or a combination thereof.

Representative examples of phthalocyanine blues and greens can include copper phthalocyanine blue, copper phthalocyanine green and derivatives thereof such as Pigment Blue 15, Pigment Blue 15:3, and Pigment Green 36. Representative examples of perylene pigments can include Pigment Red 123, Pigment Red 190, Pigment Red 189, and Pigment Red 224. Representative examples of a perinone pigments can include Pigment Orange 43 and Pigment Red 194. Representative examples of anthraquinone pigments can include Pigment Red 43, Pigment Red 194, Pigment Red 177, Pigment Red 216, and Pigment Red 226. Representative examples of quinacridone pigments can include Pigment Orange 48, Pigment Orange 49, Pigment Red 122, Pigment Red 192, Pigment Red 202, Pigment Red 206, Pigment Red 209, Pigment Violet 19, and Pigment Violet 42. Representative examples of dioxazine pigments can include Pigment Violet 23 and Pigment Violet 37. Representative examples of thioindigo pigments can include Pigment Red 86, Pigment Red 87, Pigment Red 198, Pigment Violet 36, and Pigment Violet 38. Representative examples of heterocyclic yellows include Pigment Yellow 1, Pigment Yellow 12, Pigment Yellow 13, Pigment Yellow 14, Pigment Yellow 17, Pigment Yellow 73, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Other pigments that can be used include DIC-QA Magenta Pigment, Pigment Red 150, and Pigment Yellow 74. The above pigments can be commercially available in powder, press cake, or dispersion form from a number of sources. If the colorist desires, two or more pigments can be combined to create a color that provides truer color mixing within an ink set, or for some other purpose.

The pigment can be present in the ink composition at from 1 wt % to 8 wt %. In yet other examples, the pigment can be present in the ink composition from 1 wt % to 6 wt %, from 2 wt % to 6 wt %, or from 2 wt % to 45 wt %.

The pigment(s) can be dispersed by a dispersant that is adsorbed or ionically attracted to a surface of the pigment or can be covalently attached to a surface of the pigment as a self-dispersed pigment. In one example, the dispersant can be an acrylic dispersant, such as a styrene (meth)acrylate dispersant, or other dispersant suitable for keeping the pigment suspended in the ink vehicle. In one example, the styrene (meth)acrylate dispersant can be used, as it can promote π-stacking between the aromatic ring of the dispersant and various types of pigments. In one example, the styrene (meth)acrylate dispersant can have a weight average molecular weight from 4,000 Mw to 30,000 Mw. In another example, the styrene-acrylic dispersant can have a weight average molecular weight of 8,000 Mw to 28,000 Mw, from 12,000 Mw to 25,000 Mw, from 15,000 Mw to 25,000 Mw, from 15,000 Mw to 20,000 Mw, or about 17,000 Mw. Regarding the acid number, the styrene (meth)acrylate dispersant can have an acid number from 100 mg KOH/g to 350 mg KOH/g, from 120 mg KOH/g to 350 mg KOH/g, from 150 mg KOH/g to 300 mg KOH/g, from 180 mg KOH/g to 250 mg KOH/g, or about 201 mg KOH/g to 220 mg KOH/g, for example. Example commercially available styrene-acrylic dispersants can include JONCRYL® 671, JONCRYL® 71, JONCRYL® 96, JONCRYL® 680, JONCRYL® 683, JONCRYL® 678, JONCRYL® 690, JONCRYL® 296, JONCRYL® 671, JONCRYL® 696 or JONCRYL® ECO 675 (all available from BASF Corp., Germany).

The term "(meth)acrylic" refers to monomers, copolymerized monomers, etc., that can either be acrylate or methacrylate (or a combination of both), or acrylic acid or methacrylic acid (or a combination of both), as the acid or salt/ester form can be a function of pH. Furthermore, even if the monomer used to form the polymer was in the form of a (meth)acrylic acid during preparation, pH modifications during preparation or subsequently when added to an ink composition can impact the nature of the moiety as well (acid form vs. salt or ester form). Thus, a monomer or a moiety of a polymer described as (meth)acrylic should not be read so rigidly as to not consider relative pH levels, ester chemistry, and other organic chemistry concepts.

In another example, the dispersant can have any of a number of acid number values, e.g., from 5 mg KOH/g to 250 mg KOH, from 15 to 225, or from 25 to 200, for example. Stability of the pigment, both in staying dispersed as well as pigment particle stability per se, can be considered when selecting a dispersant, e.g., particle size instability can occur with the dispersed pigment particles coming together or aggregating to form larger particle, which may result in pigment settling. This acid number or acid value range can play a role in pigment stability, particle size over time, particle agglomeration, and other undesirable attributes with some pigments. In further detail, in some examples, the dispersant can have a weight average molecular weight ranging from 1,000 Mw to 25,000 Mw, from 20,00 Mw to 20,000 Mw, or from 3,000 Mw to 15,000 Mw, for example. The dispersant, e.g., styrene acrylic resin dispersant, and the pigment can be present in the ink composition at a pigment to dispersant weight ratio from 20:1 to 2:1, or from 10:1 to 5:1, for example.

Various other additives can be included in the ink compositions to enhance properties of the ink composition for specific applications. Examples of these additives can include, but are not limited to, additional polymers, chelating/sequestering agents, surfactants, antimicrobial agents, UV absorbers, pH buffers, viscosity modifiers, and/or other additives. These are not considered when calculating the organic co-solvent concentration.

If a surfactant is included, examples can include any suitable surfactant, such as non-ionic, cationic, and/or anionic surfactant(s). Examples include a silicone-free alkoxylated alcohol surfactant such as, for example, TEGO® Wet 510 (Evonik Tego Chemie GmbH, Germany) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylated acetylenic diol), SURFYNOL® CT 211 (non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont, USA); TERGITOL™ TMN-3 and TERGITOL™ TMN-6 (both of which are branched secondary alcohol ethoxylate, non-ionic surfactants), and TERGITOL™ 15-S-3, TERGITOL™ 15-S-5, and TERGITOL™ 15-S-7 (each of which is a secondary alcohol ethoxylate, non-ionic surfactant) (all of the TERGITOL™ surfactants are available from The Dow Chemical Co., USA).

With respect to the antimicrobial, if included, any compound suitable to inhibit the growth of harmful microorganisms can be included. These additives may be biocides, fungicides, and other microbial agents. Examples of suitable microbial agents can include, but are not limited to, ACTICIDE® B20, ACTICIDE® M20 (both from Thor Specialties Inc., USA), NUOSEPT™ (Ashland Specialty Ingredients, China), UCARCIDE™ (Union Carbide Corp., USA), VANCIDE® (R.T. Vanderbilt Co., USA), PROXEL™ (ICI Americas Inc., USA), or a combination thereof. When present, additives to inhibit the growth of harmful microorganisms can be present at from 0.1 wt % to 3 wt % or from 0.1 wt % to 0.5 wt %, for example.

If a chelating agent is included, the chelating agent can be selected from 1,3-propylenediiaminetetraacetic acid, ethylenediamine-N,N-disuccinic acid trisodium salt, glutamic acid, N,N-diacetic acid, alpha-alaninediacetic acid trisodium salt, ethyl diglycol, disodium ethanoldiglycine, 4,5-dihydroxy-1,3-benzenesulfonic acid, or a combination thereof. In one example, the chelating agent can include 1,3-propylenediiaminetetraacetic acid. The chelating agent can be present at from 0.001 wt % to 1 wt %, from 0.05 wt % to 0.5 wt %, or from 0.005 wt % to 0.1 wt %.

The ink composition further includes polyurethane particles with the graft polyurethane copolymers as previously described. For example, the polyurethane particles can be included in the ink composition at from 1 wt % to 15 wt %, from 2 wt % to 12 wt %, from 3 wt % to 10 wt %, or from 3 wt % to 8 wt %, for example. In other words, the polyurethane particles as described previously can be dispersed in the ink compositions of the present disclosure. For example, the polyurethane particles can be formulated into an ink composition by adding ingredients to the graft polyurethane copolymer dispersion previously described, resulting in an ink composition for printing, e.g., from an inkjet printer.

Multi-Fluid Kits

Figure 3:
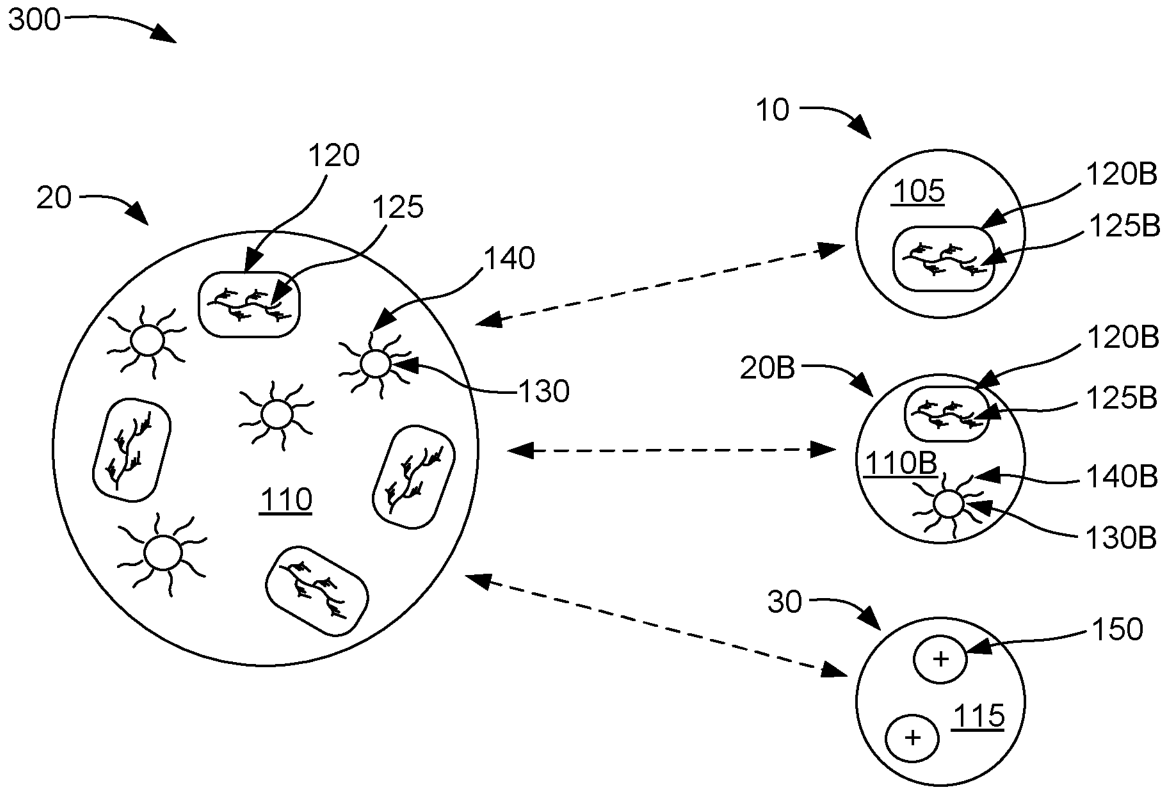
FIG. 3 schematically illustrates an example multi-jet fluid kit in accordance with the present disclosure.

As shown in FIG. 3, the ink composition 20 shown in FIG. 1B can be combined with any of a number of secondary fluid compositions to provide a multi-fluid kit 300 that can be used for printing, such as inkjet printing on packaging print media, for example. The ink composition, as mentioned, is a more specific type of graft polyurethane copolymer dispersion that includes additional ingredients relative to that shown in FIGS. 1A and 1B. For example, the ink composition can include an ink vehicle 110 and polyurethane particles 120 that include a graft polyurethane copolymer 125, as previously described. The ink composition can further include pigment 230, such as an inorganic or organic pigment colorant, and the pigment can be dispersed by a dispersant 240, for example. The secondary fluid composition can be, for example, a graft polyurethane copolymer dispersion 10 which includes a dispersion vehicle 105 with polyurethane particles 120B that include graft polyurethane copolymer 125B. This graft polyurethane copolymer dispersion may not be an ink composition, as it can be devoid of colorant. It could thus be used as an overcoating composition to protect the ink composition or to add additional polyurethane particles to a printed image, for example. In another example, the secondary fluid composition can also be an ink composition 20B, which includes an ink vehicle 110B containing polyurethane particles 120B that also include a graft polyurethane copolymer 125B. In the second ink composition, a pigment 230B, such as an inorganic or organic pigment colorant, can also be present and can likewise be dispersed by a dispersant 240B, for example. In yet another example, the secondary fluid can be a fixer composition 30 that includes a fixer vehicle 115 and a cationic compound 150.

In one example, when the secondary fluid is a fixer composition, the cationic component can act as a crashing agent to crash out the pigment when the two fluids are contacted, typically on the print media, or packaging print media. For example, the fixer compositions can be any chemical that reacts with the ink composition to cause the colorant in the ink composition to remain on the surface of the substrate when the ink composition is printed, thus typically enhancing image quality. Fixer compositions can include metal salts that can help fix pigments on the substrate. In certain specific examples, the fixer composition can be underprinted relative to the ink composition. Example cationic compounds that can be used include any of a number of inorganic salts, organic salts, cationic polymer, e.g., cationic polyamines, or the like. Non-limiting examples of inorganic and/or organic salt fixers can include salts of metal cations such as $Ca^{2+}$, $Cu^{2+}$, $Ni^{2+}$, $Mg^{2+}$, $Zn^{2+}$ $Ba^{2+}$, $Al^{3+}$, $Fe^{3+}$ or $Cr^{3+}$ with anions such as $Cl^-$, $I^-$, $Br^-$, $NO_3^-$ or $RCOO^-$, where R can be H or a lower alkyl and/or alicyclic hydrocarbon chain, for example. With multivalent cationic components, examples of cationic compounds can include, for example alkaline earth metals complexed with nitrates and/or lower alkyl (C1-C4) carboxylates. For example, in one specific example, the cationic compound can include calcium propionate, calcium nitrate, or a combination thereof.

Notably, there can be multiple secondary fluids of different types and/or multiple secondary fluids of the same type, e.g., multiple ink compositions of different colors with different colored pigments. These secondary fluids are shown by way of example, and are not intended to be limiting. Also, reference numerals with the letter "B" do not infer either the same or different compound or composition in respective fluids of the multi-fluid kits, but rather are used to simply provide clarity regarding which feature is currently being described.

Methods of Printing

Figure 4:
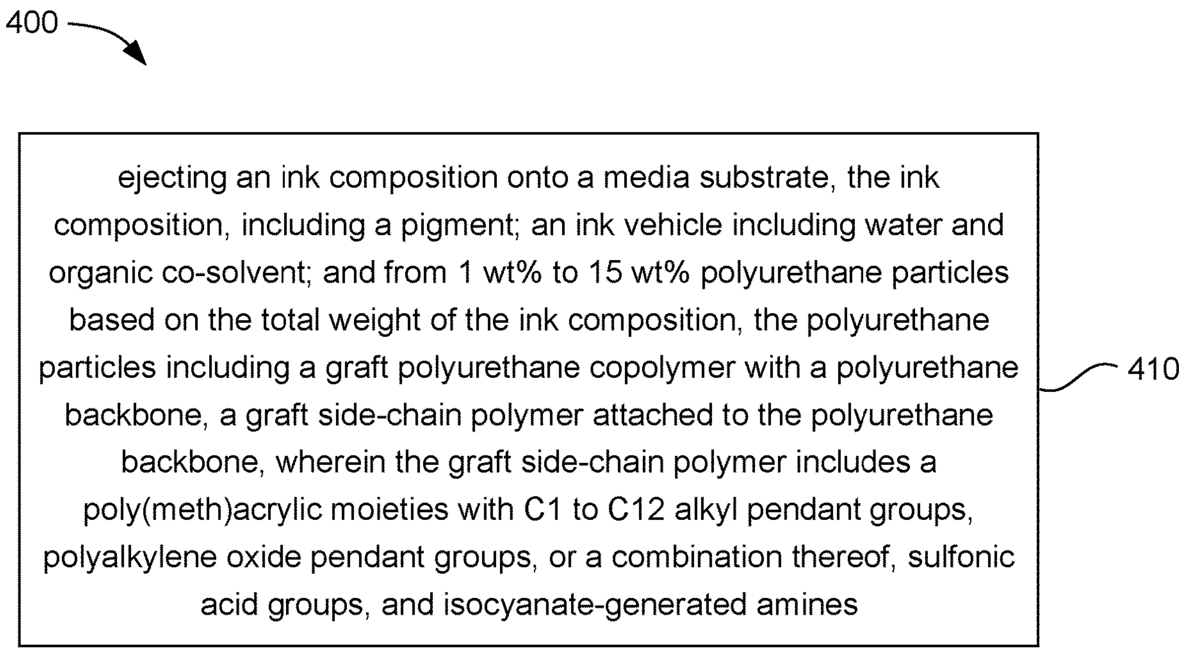
FIG. 4 illustrates an example method of printing in accordance with the present disclosure.

Turning now to FIG. 4, a method of printing 400 can include ejecting 410 an ink composition onto a media substrate, where the ink composition includes a pigment, an ink vehicle with water, e.g., from 30 wt % to 75 wt % water based on the total ink composition content, and organic co-solvent based, e.g., from 4 wt % to 35 wt % based on total weight of the ink composition, and from 1 wt % to 15 wt % polyurethane particles based on the total weight of the ink composition. The polyurethane particles can include a graft polyurethane copolymer including a polyurethane backbone, a graft side-chain polymer attached to the polyurethane backbone, wherein the graft side-chain polymer includes poly(meth)acrylic moieties with C1 to C12 alkyl pendant groups, polyalkylene oxide pendant groups, or a combination thereof, as well as sulfonic acid groups and isocyanate-generated amines. As mentioned, in one example, the isocyanate-generated amines can be in the form of self-crosslinked groups or crosslinkable amine groups available for crosslinking. In further detail, the media substrate can be packaging media, such as a printable liner attached to or attachable to a flute of a corrugated article using a hot corrugation process at temperatures from 140° C.

to 220° C., and a foldable packaging with established foldable score or crease. Three types of commercially available packaging media are referred to by their trade names Sterling Ultra Gloss paper or "SUG 80" (coated, 80 pound; available from Verso Corp, USA), Graph+ (coated; liner media for paper board such as corrugated packaging; available from Metsa Board, USA); ProVantage Komiwhite (uncoated; white top kraftliner with Nordic fiber paper board usable for corrugated packaging; available from Mondi, United Kingdom). As an example, Graph+ is a coated packaging media liner that can be used for corrugated packaging applications, such as on flute corrugated board, e.g., PWell™ E-flute corrugated board.

In some examples, the method can including printing with multiple ink compositions on the media substrate, such as the packaging media substrate. In these examples, the ink composition can include more than one colored ink in some examples, and there can be as many colored inks as the colorist designs. As an example and without limitation, the ink set may include black, cyan, magenta, yellow, orange, violet, green, etc. Any of the colored inks can be considered as the "colored ink" in this example, provided it is not black, gray, or white. In further detail, there may even be multiple black inks as well in some examples, e.g., photo black, gray, matte black, etc. The colored ink (or one or more of the colored inks) and/or the black ink can include the same ink vehicle as previously described, for example, and can also include graft polyurethane copolymer as described herein. The pigment can be present in the multiple ink compositions individually at from 1 wt % to 8 wt %. In yet other examples, the pigment can be present in the ink compositions at from 1 wt % to 6 wt %, from 2 wt % to 6 wt %, or from 2 wt % to 45 wt %.

In some examples, the ink compositions of the present disclosure can be printed on a media substrate, and then can be heated to enhance its mechanical properties, such as wet and/or dry rub resistance. For example, a recording medium may be passed through a heating zone (or otherwise heated) at a temperature greater than 70° C., or greater than 100° C., e.g., from 70° C. to 450° C., from 70° C. to 300° C., from 70° C. to 200° C., from 150° C. to 450° C., or from 300° C. to 450° C., depending on the application. For example, if printing on a liner for use in preparing corrugated packaging, the ink composition may be formulated for higher processing temperatures, as corrugated packaging may be subjected to heat at the higher end of these temperature ranges. Or, in another example, a droplet of an aqueous inkjet ink can be ejected through a printhead nozzle and onto a surface of packaging media, after which the packaging medium with the inkjet ink composition printed thereon is placed on a heat presser from 70° C. to 200° C. for from 15 seconds to 5 minutes, or from 1 minute to 3 minutes, for example.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

The term "acid value" or "acid number" refers to the mass of potassium hydroxide (KOH) in milligrams that can be used to neutralize one gram of substance (mg KOH/g), such as the polyurethane disclosed herein. This value can be determined, in one example, by dissolving or dispersing a known quantity of a material in organic solvent and then titrating with a solution of potassium hydroxide (KOH) of known concentration for measurement.

"D50" particle size is defined as the particle size at which about half of the particles are larger than the D50 particle size and about half of the other particles are smaller than the D50 particle size (by weight based on the metal particle content of the particulate build material). As used herein, particle size with respect to the polyurethane particles can be based on volume of the particle size normalized to a spherical shape for diameter measurement, for example. Particle size can be collected using a Malvern Zetasizer, for example. Likewise, the "D95" is defined as the particle size at which about 5 wt % of the particles are larger than the D95 particle size and about 95 wt % of the remaining particles are smaller than the D95 particle size. Particle size information can also be determined and/or verified using a scanning electron microscope (SEM).

EXAMPLES

The following illustrates examples of the present disclosure. However, it is to be understood that the following is only illustrative of the application of the principles of the present disclosure. Numerous modifications and alternative ink compositions, ink sets, methods, etc., may be devised without departing from the scope of the present disclosure. The appended claims are intended to cover such modifications and arrangements.

Example 1

Synthesis of Graft Polyurethane Copolymer Dispersion 1 (GPUD-1)

14.213 grams of polycarbonate polyol (Kuraray C-1090, 1000 Mw), graft side-chain polymeric polyol prepared as shown in Formula III (60.641 grams, 72.52 wt % in ethyl acetate), 26.860 grams of isophorone diisocyanate (IPDI), and 4.06 grams of 2,2-bis(hydroxymethyl)propionic acid (DMPA), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 5.40 wt %. Theoretical wt % NCO should be 5.42 wt %. The polymerization temperature was reduced to 40° C. 21.783 grams of an aminoalkylsulphonate (sodium 2-[(2-aminoethyl)amino] ethanesulfonate; 50 wt % in water; Vestamin® A-95 from Evonik, Germany) and 2.542 grams of 50 wt % sodium hydroxide aqueous solution in 54.456 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slightly hazy. The mixture was continuously stirred for 30 minutes at 40° C. Then cold 149.271 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 126.5 nm. The pH was 8.5. The solids content was 26.76 wt %.

Example 2

Synthesis of Graft Polyurethane Copolymer Dispersion 2 (GPUD-2)

14.135 g of polycarbonate polyol (Kuraray C-1090, 1000 Mw), graft side-chain polymeric polyol prepared as shown in Formula III (60.309 grams, 72.52 wt % in ethyl acetate), 26.713 grams of isophorone diisocyanate (IPDI), and 2.728 grams of 2,2-bis(hydroxymethyl)propionic acid (DMPA), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 6.42 wt %. Theoretical wt % NCO should be 6.45 wt %. The polymerization temperature was reduced to 40° C. 25.377 grams of an aminoalkylsulphonate (sodium 2-[(2-aminoethyl)amino] ethanesulfonate; 50 wt % in water; Vestamin® A-95 from Evonik, Germany) and 1.708 grams of 50 wt % sodium hydroxide aqueous solution in 63.442 grams of deionized water were mixed in a beaker until the aminoalklysulphonate was completely dissolved. The aminoalkylsulphonate solution was added to the pre-polymer solution at 40° C. with vigorous stirring over 5 minutes. The solution became viscous and slight hazy. The mixture was continuously stirred for 30 minutes at 40° C. Then cold 142.173 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 159 nm. The pH was 8.5. The solids content was 27.99 wt %.

Example 3

Synthesis of Graft Polyurethane Copolymer Dispersion 3 (GPUD-3)

14.056 grams of polycarbonate polyol (Kuraray C-1090, 1000 Mw), graft Side-chain polymeric polyol prepared as shown in Formula III (59.967 grams, 72.52 wt % in ethyl acetate), 26.561 grams of isophorone diisocyanate (IPDI), and 1.356 grams of 2,2-bis(hydroxymethyl)propionic acid (DMPA), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 7.52 wt %. Theoretical wt % NCO should be 7.54 wt %. The polymerization temperature was reduced to 40° C. 29.08 grams of an aminoalkylsulphonate (sodium 2-[(2-aminoethyl)amino] ethanesulfonate; 50 wt % in water; Vestamin® A-95 from Evonik, Germany) and 0.849 grams of 50 wt % sodium hydroxide aqueous solution in 72.699 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 134.862 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 215.3 nm. The pH was 9. The solids content was 29.88 wt %.

Example 4

Synthesis of Graft Polyurethane Copolymer Dispersion 4 (GPUD-4)

13.975 g of polycarbonate polyol (Kuraray C-1090, 1000 Mw), graft side-chain polymeric polyol prepared as shown in Formula III (59.629 grams, 72.52 wt % in ethyl acetate), and 26.411 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 8.63 wt %. Theoretical wt % NCO should be 8.67 wt %. The polymerization temperature was reduced to 40° C. 32.740 grams of an aminoalkylsulphonate (sodium 2-[(2-aminoethyl)amino] ethanesulfonate; 50 wt % in water; Vestamin® A-95 from Evonik, Germany) and 81.851 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 127.633 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 209 nm. The pH was 8.5. The solids content was 29.28 wt %.

Example 5

Synthesis of Graft Polyurethane Copolymer Dispersion 5 (GPUD-5)

24.888 g of polycarbonate polyol (Kuraray C-2090, Mw 2000), graft side-chain polymeric polyol prepared as shown in Formula III (53.095 grams, 72.52 wt % in ethyl acetate), 23.517 grams of isophorone diisocyanate (IPDI), and 3.554 grams of 2,2-bis(hydroxymethyl)propionic acid (DMPA), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 4.65 wt %. Theoretical wt % NCO should be 4.68 wt %. The polymerization temperature was reduced to 40° C. 19.072 grams of an aminoalkylsulphonate (sodium 2-[(2-aminoethyl)amino] ethanesulfonate; 50 wt % in water; Vestamin® A-95 from Evonik, Germany) and 2.226 grams of 50 wt % sodium hydroxide aqueous solution in 47.680 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 156.766 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 266.5 nm. The pH was 8.5. The solids content was 31.18 wt %.

Example 6

Synthesis of Graft Polyurethane Copolymer Dispersion 6 (GPUD-6)

24.768 g of polycarbonate polyol (Kuraray C-2090, Mw 2000), graft side-chain polymeric polyol prepared as shown in Formula III (52.840 grams, 72.52 wt % in ethyl acetate), 23.404 grams of isophorone diisocyanate (IPDI), and 2.390 grams of 2,2-bis(hydroxymethyl)propionic acid (DMPA), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 5.52 wt %. Theoretical wt % NCO should be 5.55 wt %. The polymerization temperature was reduced to 40° C. 22.234 grams of an aminoalkylsulphonate (sodium 2-[(2-aminoethyl)amino] ethanesulfonate; 50 wt % in water; Vestamin® A-95 from Evonik, Germany) and 1.497 grams of 50 wt % sodium hydroxide aqueous solution in 55.586 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 150.511 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 415.8 nm. The pH was 9. The solids content was 30.08 wt %.

Example 7

Synthesis of Graft Polyurethane Copolymer Dispersion 7 (GPUD-7)

24.465 g of polycarbonate polyol (Kuraray C-2090, Mw 2000), graft side-chain polymeric polyol prepared as shown in Formula III (52.578 grams, 72.52 wt % in ethyl acetate), 23.288 grams of isophorone diisocyanate (IPDI), and 1.189 grams of 2,2-bis(hydroxymethyl)propionic acid (DMPA), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 6.45 wt %. Theoretical wt % NCO should be 6.48 wt %. The polymerization temperature was reduced to 40° C. 25.496 grams of an aminoalkylsulphonate (sodium 2-[(2-aminoethyl)amino] ethanesulfonate; 50 wt % in water; Vestamin® A-95 from Evonik, Germany) and 0.745 grams of 50 wt % sodium hydroxide aqueous solution in 63.740 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 144.059 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 875.9 nm. The pH was 8.5. The solids content was 31.02 wt %.

Example 8

Synthesis of Graft Polyurethane Copolymer Dispersion 8 (GPUD-8)

24.523 g of polycarbonate polyol (Kuraray C-2090, Mw 2000), graft side-chain polymeric polyol prepared as shown in Formula III (52.318 grams, 72.52 wt % in ethyl acetate), and 23.173 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 7.40 wt %. Theoretical wt % NCO should be 7.43 wt %. The polymerization temperature was reduced to 40° C. 28.726 grams of an aminoalkylsulphonate (sodium 2-[(2-aminoethyl)amino] ethanesulfonate; 50 wt % in water; Vestamin® A-95 from Evonik, Germany) and 71.815 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 137.671 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 207 nm. The pH was 9. The solids content was 24.78 wt %.

Example 9

Synthesis of Graft Polyurethane Copolymer Dispersion 9 (GPUD-9)

13.975 g of polypropylene glycol(PPG1K, 1000 Mw), graft side-chain polymeric polyol prepared as shown in Formula III (59.629 grams, 72.52 wt % in ethyl acetate), and 26.411 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 8.65 wt %. Theoretical wt % NCO should be 8.67 wt %. The polymerization temperature was reduced to 40° C. 32.740 grams of an aminoalkylsulphonate (sodium 2-[(2-aminoethyl)amino] ethanesulfonate; 50 wt % in water; Vestamin® A-95 from Evonik, Germany) and 81.851 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 127.633 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 70.62 nm. The pH was 9. The solids content was 27.82 wt %.

Example 10

Synthesis of Graft Polyurethane Copolymer Dispersion 10 (GPUD-10)

24.523 g of polypropylene glycol(PPG2K, Mw 2000), graft side-chain polymeric polyol prepared as shown in Formula III (52.318 grams, 72.52 wt % in ethyl acetate), 23.173 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 5.40 wt %. Theoretical wt % NCO should be 5.42 wt %. The polymerization temperature was reduced to 40° C. 28.726 grams of an aminoalkylsulphonate (sodium 2-[(2-aminoethyl)amino] ethanesulfonate; 50 wt % in water; Vestamin® A-95 from Evonik, Germany) and 71.815 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 137.671 grams of deionized water was added to polymer mixture in 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 27.88 nm. The pH was 9. The solids content was 25.85 wt %.

Example 11

Synthesis of Graft Polyurethane Copolymer Dispersion 11 (GPUD-11)

30.490 g of polypropylene glycol(PPG2.7K, Mw 2700), graft side-chain polymeric polyol prepared as shown in Formula III (48.182 grams, 72.52 wt % in ethyl acetate), 21.341 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 6.73 wt %. Theoretical wt % NCO should be 6.75 wt %. The polymerization temperature was reduced to 40° C. 21.783 grams of an aminoalkylsulphonate (sodium 2-[(2-aminoethyl)amino] ethanesulfonate; 50 wt % in water; Vestamin® A-95 from Evonik, Germany) and 66.138 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 143.349 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 42.42 nm. The pH was 8.5. The solids content was 23.74 wt %.

Example 12

Synthesis of Graft Polyurethane Copolymer Dispersion 12 (GPUD-12)

10.537 g of polypropylene glycol(PPG 725, Mw 725), graft side-chain polymeric polyol prepared as shown in Formula III (62.012 grams, 72.52 wt % in ethyl acetate), 27.467 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 9.07 wt %. Theoretical wt % NCO should be 9.09 wt %. The polymerization temperature was reduced to 40° C. 34.049 grams of an aminoalkylsulphonate (sodium 2-[(2-aminoethyl)amino] ethanesulfonate; 50 wt % in water; Vestamin® A-95 from Evonik, Germany) and 85.122 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 124.361 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 32.42 nm. The pH was 8.5. The solids content was 23.72 wt %.

Example 13

Synthesis of Graft Polyurethane Copolymer Dispersion 13 (GPUD-13)

7.513 g of polycarbonate polyol (Kuraray C-590, Mw 500), graft side-chain polymeric polyol prepared as shown in Formula III (64.109 grams, 72.52 wt % in ethyl acetate), 28.396 grams of isophorone diisocyanate (IPDI), and 42 grams of acetone were mixed in a 500 mL of 4-neck round bottom flask. A mechanical stirrer with glass rod and TEFLON™ (from Chemours, USA) blade was attached. A condenser was attached. The flask was immersed in a constant temperature bath at 60° C. The system was kept under a drying tube. 3 drops of dibutyltin dilaurate (DBTDL) was added to initiate the polymerization. Polymerization was continued for 3 hours at 60° C. 0.5 gram samples was withdrawn for wt % NCO titration to confirm the reaction. The measured NCO value was 9.43 wt %. Theoretical wt % NCO should be 9.46 wt %. The polymerization temperature was reduced to 40° C. 35.200 grams of an aminoalkylsulphonate (sodium 2-[(2-aminoethyl)amino] ethanesulfonate; 50 wt % in water; Vestam in® A-95 from Evonik, Germany) and 88 grams of deionized water were mixed in a beaker until the aminoalklysulphonate was completely dissolved. The aminoalklysulphonate solution was added to the pre-polymer solution at 40° C. with vigorous stirring over 5 minutes. The solution became viscous and slight hazy. The mixture was continuously stirred for 30 minutes at 40° C. Then cold 121.483 grams of deionized water was added to the polymer mixture in the 4-neck round bottom flask over 10 minutes with good agitation to form a graft polyurethane copolymer dispersion. The agitation was continued for 60 minutes at 40° C. The graft polyurethane copolymer dispersion was filtered through 400 mesh stainless sieve. Acetone was removed with Rotorvap at 40° C. (add 2 drops; 20 mg; BYK-011 de-foaming agent). The final graft polyurethane copolymer dispersion was filtered through fiber glass filter paper. The D50 particle size was measured by a Malvern Zetasizer at 40.59 nm. The pH was 9. The solids content was 24.77 wt %.

Example 14

Summary of Graft Polyurethane Copolymer Dispersions

A summary of the graft polyurethane copolymer dispersions prepared in accordance with Examples 1-13 are provided below in Tables 3A and 3B. Details about two additional graft polyurethane copolymer dispersions as comparatives (COMP-14 and COMP-15) are also shown, but which do not include isocyanate-generated amines from excess isocyanate groups. These comparative graft polyurethane copolymers can be prepared using similar protocols of that from Example 1-13. The details of these comparative examples is provided below in Table 4.

TABLE 3A

Graft Polyurethane Copolymer Monomeric Components (GPUD 1-13)

| GPUD-ID | IPDI (wt %) | Graft Side-chain Polymeric Polyol (wt %) | Polycarbonate Polyol (wt %) | Polyether Polyol (wt %) | Aminoalkyl Sulfonic Acid (wt %) | Carboxylic Acid from DMPA (wt %) |
|---|---|---|---|---|---|---|
| 1 | 26.9 | 43.977 | 14.213* | — | 10.891 | 4.06 |
| 2 | 26.713 | 43.736 | 14.135* | — | 12.688 | 2.728 |
| 3 | 26.561 | 43.488 | 14.055* | — | 14.54 | 1.356 |
| 4 | 26.411 | 43.243 | 13.975* | — | 16.37 | |
| 5 | 23.517 | 38.505 | 24.888† | — | 9.536 | 3.554 |
| 6 | 23.404 | 38.32 | 24.768† | — | 11.117 | 2.39 |
| 7 | 23.288 | 38.129 | 24.645† | — | 12.748 | 1.189 |
| 8 | 23.173 | 37.941 | 24.523† | — | 14.363 | — |
| 9 | 26.411 | 43.243 | — | 13.975** | 16.37 | — |
| 10 | 23.173 | 37.941 | — | 24.523** | 14.363 | — |
| 11 | 21.341 | 34.942 | — | 30.49** | 13.228 | — |
| 12 | 27.467 | 44.971 | — | 10.537** | 17.024 | — |
| 13 | 28.396 | 46.492 | 70.513‡ | — | 17.6 | — |

*KURARAY ® C-1090 at 1000 Mw;
†KURARAY ® C-2090 at 2,000 Mw;
‡KURARAY ® C-590 at 500 Mw, from Kuraray America, Inc. (USA).
**Polypropylene Glycol (GPUD 9 at 1000 Mw; GPUD 10 at 2,000 Mw; GPUD 11 at 2,700 Mw; and GPUD 12 at 725 Mw).

TABLE 3B

Graft Polyurethane Copolymer Dispersion Properties (GPUD 1-13)

| GPUD-ID | Total Solids (wt %) | D50 Particle Size (nm) | pH | Acid Number (mg KOH/g) |
|---|---|---|---|---|
| 1 | 26.76 | 126.5 | 8.5 | 49.1 |
| 2 | 27.99 | 159 | 8.5 | 48.8 |
| 3 | 29.88 | 215.3 | 9 | 48.6 |
| 4 | 29.28 | 209 | 8.5 | 48.3 |
| 5 | 31.18 | 266.5 | 8.5 | 43 |
| 6 | 30.08 | 415.8 | 9 | 42.8 |
| 7 | 31.02 | 875.9 | 8.5 | 42.6 |
| 8 | 24.78 | 207 | 9 | 42.4 |
| 9 | 27.82 | 70.6 | 9 | 48.3 |
| 10 | 25.85 | 21.9 | 9 | 42.4 |
| 11 | 23.74 | 42.4 | 8.5 | 39 |
| 12 | 23.72 | 32.4 | 8.5 | 50.2 |
| 13 | 24.77 | 40.6 | 9 | 51.9 |

TABLE 4

Comparative Graft Polyurethane Copolymer Monomeric Components (COMP-14 and COMP-15)

| GPUD-ID | IPDI or H12MDI (wt %) | Graft Side-chain Polymeric Polyol (wt %) | Poly-carbonate Polyol (wt %) | Poly-ether Polyol (wt %) | Amino alkyl Sulfonic Acid (wt %) | Carbox-ylic Acid from DMPA (wt %) |
|---|---|---|---|---|---|---|
| COMP-14 | 27 (IPDI) | 43.9 | — | 14.2 | 10.8 | 4.1 |
| COMP-15 | 32.1 (H12MDI) | 44.1 | 10 | — | 9.7 | 4.1 |

Example 15

Preparation on Ink Compositions and Fixer Composition

Thirteen (13) ink compositions were prepared using the graft polyurethane copolymer dispersions prepared in accordance with Examples 1-13 and summarized in Tables 3A and 3B of Example 14, and two additional comparative inks were prepared using the comparative graft polyurethane copolymer dispersions summarized in Table 4 of Example 14, but which did not include isocyanate-generated amines from excess isocyanate groups. The ink compositions prepared all had the following formulation, with the only difference being which graft polyurethane copolymer dispersion selected for inclusion. The weight percentages provided below are based on the respected solids content of the various components. The ink composition formulation used is shown in Table 5A and the fixer composition used is shown in Table 5B, as follows:

TABLE 5A

| Ink Composition | | |
|---|---|---|
| Component | Component Description | Weight Percent (wt %) |
| GPUD 1-13 | Graft Polyurethane Copolymer Dispersion | 5 |
| Tripropylene Glycol | Organic Co-solvent | 5 |
| DOWANOL ® TPM | Organic Co-solvent | 3 |
| LIPONIC ™ EG-1 | Organic Co-solvent | 0.5 |
| METOLAT ® 780 | Surfactant | 1.4 |
| ACTICIDE ® B20 | Biocide | 0.15 |
| ACTICIDE ® M20 | Biocide | 0.065 |
| LIQUILUBE ™ LL 405 | Polyolefin Wax Particles | 0.65 |
| Carbon Black | Dispersed Pigment | 3 |

DOWANOL ® is available from Dow (USA).
LIPONIC ™ EG-1 is available from Vantage Specialty Ingredients (USA).
METOLAT ® is available from Munzing (Germany).
ACTICIDE ® is available from Thor (USA).
LIQUILUBE ™ is available from Lubrizol (USA).

TABLE 5B

| Fixer Composition | | |
|---|---|---|
| Component | Component Description | Weight Percent (wt %) |
| Calcium Propionate | Cationic Compound | 2.8 |
| Calcium Nitrate | Cationic Compound | 8 |
| SURFYNOL ® SEF | Surfactant | 0.045 |
| SURFYNOL ® CT-211 | Surfactant | 0.02 |
| Tiron | Chelator | 0.095 |
| Tetraethylene Glycol | Organic Co-solvent | 12 |
| ACTICIDE B20 | Biocide | 0.2 |
| ACTICIDE M20 | Biocide | 0.07 |

SURFYNOL ® is available from Air Products and Chemicals, Inc. (USA).
ACTICIDE ® is available from Thor (USA).

Example 16

Ink Composition Image Quality on Multiple Types of Packaging Media

Inks 1-15 were printed on three different types of media, namely Graph+ packaging media (Graph+; coated; from Metsa Board, USA), Sterling Ultra Gloss publishing media (SUG 80; coated; 80 pound; available from Verso Corp, USA), and ProVantage Komiwhite packaging media (Komiwhite; uncoated white top kraftliner with Nordic fiber paper board; available from Mondi, United Kingdom). All of the samples were printed using HP A8214 printhead pens with 1.5 dots per pixel (dpp) of the fixer composition of Table 5B followed by 3 dpp of the ink composition of Table 5A. Notably, Inks 14 and 15 were prepared using the comparative graft polyurethane copolymer dispersion particles (COMP-14 and COMP-15), and thus are notated as COMP Ink 14 and COMP Ink 15, respectively. The data collected related to image quality is provided in Table 6, as follows:

TABLE 6

| Image Quality | | | | | | | | |
|---|---|---|---|---|---|---|---|---|
| | Graph+ | | | SUG 80 | | | Komiwhite | |
| Ink ID | OD | COA | 75 Gloss | OD | COA | 75 Gloss | OD | COA |
| 1 | 1.39 | 3.1 | 55.3 | 1.44 | 3.0 | 68.5 | 1.10 | 3.3 |
| 2 | 1.45 | 3.2 | 55.4 | 1.52 | 3.3 | 66.8 | 1.14 | 3.7 |
| 3 | 1.62 | 3.5 | 58.9 | 1.68 | 3.7 | 72.6 | 1.24 | 2.7 |
| 4 | 1.72 | 3.5 | 57.8 | 1.82 | 3.6 | 74.4 | 1.25 | 2.8 |
| 5 | 1.55 | 3.4 | 55.3 | 1.63 | 3.4 | 69.3 | 1.18 | 2.9 |
| 6 | 1.47 | 3.7 | 55.3 | 1.56 | 3.4 | 69.4 | 1.14 | 2.9 |
| 7 | 1.62 | 3.4 | 59.6 | 1.69 | 3.1 | 72.1 | 1.21 | 2.6 |
| 8 | 1.53 | 3.0 | 55.6 | 1.63 | 3.1 | 68.8 | 1.19 | 2.7 |
| 9 | 1.76 | 3.4 | 60.4 | 1.82 | 3.4 | 77.3 | 1.21 | 3.0 |
| 10 | 1.58 | 3.4 | 55.1 | 1.62 | 3.2 | 73.1 | 1.19 | 3.4 |
| 11 | 1.56 | 3.5 | 58.1 | 1.64 | 3.6 | 73.5 | 1.19 | 3.0 |
| 12 | 1.74 | 3.7 | 58.6 | 1.80 | 3.6 | 77.8 | 1.22 | 3.1 |
| 13 | 1.73 | 3.4 | 58.5 | 1.77 | 3.4 | 76.3 | 1.23 | 3.0 |
| COMP Ink 14 | 1.51 | 3.6 | 56.4 | 1.87 | 3.3 | 71.8 | 1.22 | 3.2 |
| COMP Ink 15 | 1.55 | 3.3 | 55.1 | 1.66 | 3.3 | 74.4 | 1.16 | 2.7 |

In Table 6 above, optical density (OD) was measured using an X-rite densitometer. 75 degree gloss (75 Gloss) was measured using a BYK gloss meter. Coalescence (COA) was measured and evaluated based on the uniformity of the colorant on the printed page. The measurement was taken and the scanned image was printed on the media sheet to obtain a density map. Then, Fourier transformation was used to determine the dominate frequency. Using that wavelength and amplitude, the coalescence score was calculated for various ink loadings. A score of 1 indicates no coalescence and a score of 5 indicates very high coalescence.

Table 6 provides the image quality data of the various ink compositions as it relates to the addition of different graft polyurethane copolymer dispersions thereto. Most of these ink compositions provided acceptable optical density (OD). Among those evaluated, Inks 4, 9, and 12 exhibited the highest optical density (OD), which included sulfonic acid and were devoid of carboxylic acid. The example inks (Inks 1-13) tended to exhibit good coalescence and gloss, and many also exhibited good optical density. Notably, however, COMP Ink 14 exhibited poorer image quality in many categories relative to the example ink compositions of Table 6, and were fairly significantly worse than Inks 4, 9, and 12.

Example 17

Ink Composition Durability on Multiple Types of Packaging Media

Inks 1-15 were printed on three different types of media, namely Graph+ (coated; liner media for paper board such as corrugated packaging; available from Metsa Board, USA); Sterling Ultra Gloss paper or "SUG 80" (coated, 80 pound; paper used for publishing applications available from Verso Corp, USA); and ProVantage Komiwhite (uncoated; white top kraftliner with Nordic fiber paper board usable for corrugated packaging; available from Mondi, United Kingdom). Notably, Inks 14 and 15 were prepared using the comparative graft polyurethane copolymer dispersion particles (COMP-14 and COMP-15), and thus are notated as COMP Ink 14 and COMP Ink 15, respectively. The data collected related to durability is provided in Table 7 below.

TABLE 7

| | Durability | | | | | | | |
|---|---|---|---|---|---|---|---|---|
| | Graph+ | | | SUG 80 | | | Komiwhite | |
| Ink ID | MECH | S250 | Wet Rub | MECH | S250 | Wet Rub | S250 | Wet Rub |
| 1 | 4 | 5 | 4 | 2 | 2.5 | 4 | 1 | 4 |
| 2 | 3 | 5 | 4 | 1 | 1.5 | 4 | 1 | 4 |
| 3 | 4 | 5 | 4 | 1 | 3 | 4 | 1 | 4 |
| 4 | 3.5 | 2.5 | 3.5 | 1 | 1.5 | 4 | 1 | 4 |
| 5 | 4 | 2 | 4 | 1.5 | 3.5 | 4 | 1 | 3.5 |
| 6 | 3 | 3 | 4 | 1 | 1 | 4 | 1 | 1 |
| 7 | 3 | 1 | 4 | 1 | 3 | 4 | 1 | 1 |
| 8 | 3 | 1 | 4 | 1 | 3 | 4 | 1 | 1 |
| 9 | 2.5 | 3.5 | 3 | 3.5 | 1 | 3.5 | 3.5 | 3 |
| 10 | 2.5 | 3.5 | 3 | 3 | 1 | 3.5 | 2.5 | 1 |
| 11 | 2.5 | 3.5 | 2.5 | 2.5 | 1 | 3 | 3 | 1 |
| 12 | 2.5 | 3.5 | 3 | 3.5 | 1 | 4 | 3.5 | 3.5 |
| 13 | 4 | 4 | 3.5 | 4 | 2 | 3.5 | 4 | 3 |
| COMP Ink 14 | 3.5 | 1 | 4 | 2 | 1 | 4 | 1 | 1 |
| COMP Ink 15 | 5 | 4 | 3.5 | 4 | 4 | 4 | 4 | 4.5 |

In Table 7 above, Mechanical durability (MECH) was measured using a dry smudge test using visual rankings from 1 to 5, with 5 having the least ink smudge and 1 having the most ink smudge. Smearing was carried out on black rectangles immediately after the printing with neoprene (Safeskin® Hypoclean Critical™ Gloves—HC1380S) glove tips secured by an O-ring on an earplug (Moldex Pura-Fit® #6800) that was attached to a Smeartron pen. Sutherland 250 durability (S250) was carried out by using a 4 pound weight to press the backside of the print media, rubbing either 100 or 250 round, and visually ranking the sample. If there was no damage, the rank was 5, and if severely damaged, the rank was 1. Wet Rub durability (Wet Rub) was carried out using a TMI Ink Rub tester on the printed samples, using a 50 microliters pipette to pipet four equal volumes of DI water onto the center of the colored printed samples. At the end of a 5 minute wait time, a sled with an attached TexWipe lint free cloth on the sled connector rod of the instrument was used for the smudge cycle rubbing.

Table 7 provides the durability data of the various ink compositions related to the addition of different graft polyurethane copolymer dispersions thereto. All of these inks exhibited good or excellent wet rub durability on all three types of packaging media. Furthermore, most of these inks exhibited good mechanical durability (mechability) and Sutherland durability on Graph+. All factors considered, it appears that Ink 3, Ink 4, Ink 5, Ink 9, and Ink 12 exhibited better overall durability in aggregate. The example inks (Inks 1-13) tended to exhibit reasonable durability in many instances. Notably, however, COMP Ink 14 exhibited poorer durability particularly when evaluated using the Sutherland 25 durability evaluation.

Example 18

Ink Composition Stability

Inks 1-15 were evaluated for stability using accelerated shelf life (ASL) and freeze-thaw cycling (T-cycle) evaluations. Notably, Inks 14 and 15 were prepared using the comparative graft polyurethane copolymer dispersion particles (COMP-14 and COMP-15), and thus are notated as COMP Ink 14 and COMP Ink 15, respectively. The data collected related to stability is provided in Table 8, as follows:

TABLE 8

| | Stability | | | |
|---|---|---|---|---|
| Ink ID | % Δ ASL pH | % Δ ASL Viscosity | % Δ ASL D50 | % Δ T-cycle D50 |
| 1 | −0.54 | 7.69 | 18.82 | 29.61 |
| 2 | −0.50 | 29.63 | 88.4 | 70.17 |
| 3 | −0.51 | 0 | 2.52 | −1.38 |
| 4 | −0.54 | 0 | 6.48 | 7.9 |
| 5 | −0.49 | 0 | 7.87 | 9.48 |
| 6 | −0.87 | 16 | 61.8 | 186.2 |
| 7 | −0.7 | −3.7 | 19.9 | 17.2 |
| 8 | −0.78 | 7.7 | 61 | 151.2 |
| 9 | −0.54 | 2.6 | 324.4 | 10.5 |
| 10 | −0.63 | 2.9 | 18.7 | 99.7 |
| 11 | −0.56 | 1.6 | 16.4 | 172 |
| 12 | −0.72 | 2.9 | 12.2 | 100.1 |
| 13 | −0.87 | 99.9 | 16.2 | 123.4 |
| COMP Ink 14 | −0.34 | 0 | 11 | 12 |
| COMP Ink | 4 | 4 | 3.5 | −0.31 |

With respect to accelerated shelf life stability (ASL), 30 mL samples were stored in an oven at 60° C. for 7 days. Following the elevated temperature storage period, the samples were allowed to equilibrate to room temperature and the change in pH, viscosity, and D50 particle size of the pigment particles in the ink composition were determined. Regarding the T-cycle, this data was collected comparing D50 pigment particle size prior to and after 5 freeze-thaw cycles where 30 mL samples were brought to a temperature of 70° C. in 20 minutes, and then maintained at 70° C. for 4 hours. The samples were then decreased from 70° C. to −40° C. in 20 minutes and maintained at −40° C. for 4 hours. This process was repeated, such that the samples were subjected to a total of 5 freeze-thaw cycles. Following the fifth cycle, the samples were allowed to equilibrate to room temperature and the D50 pigment particle sizes were determined. pH was measured using an ACCUMET XL250 pH meter from Fisher Scientific, USA, and then the change was calculated (% Δ ASL pH). Viscosity (cps) was measured using a Hydramotion VP550 viscometer from Hydramotion, USA, and then the change was calculated (% Δ ASL Viscosity). D50 pigment particle size was collected using a Malvern Zetasizer, from Malvern Panalytical, United Kingdom, and the change was calculated for ASL (% Δ ASL D50) as well as for T-cycle (% Δ T-cycle D50). As a note, the D50 particle size was determined based on the pigment particle sizes are used rather than the particle sizes of the graft polyurethane copolymer particles. The pigment particles tend to scatter light strongly in ink compositions, making it difficult for the graft polyurethane copolymer particles to show up significantly in the data. Thus, in determining compatibility, the size of the pigment can be used. This is because when the pigment is not compatible with graft polyurethane copolymer particles, the pigment particles tend to agglomerate and grow or otherwise change in detectable changed particle size.

Table 8 provides the stability data of the various ink compositions related to the addition of different graft polyurethane copolymer dispersions thereto. As shown by this table, all of the graft polyurethane copolymer dispersions showed reasonable ASL and T-cycle stabilities, including with respect to particle size, pH stability, and viscosity. Among these black inks, Ink 3, Ink 4, and Ink 5 exhibited the best overall ASL and T-cycle stability.

Example 19

Ink Composition Printhead Reliability

Inks 1-15 were evaluated for printhead reliability from an HP thermal inkjet printer. Notably, Inks 14 and 15 were prepared using the comparative graft polyurethane copolymer dispersion particles (COMP-14 and COMP-15), and thus are notated as COMP Ink 14 and COMP Ink 15, respectively. The data was collected and shown in Table 9 below.

TABLE 9

Printhead Reliability

| Ink ID | Decap | DW | DW 2K | DV | Decel | TOE |
|---|---|---|---|---|---|---|
| 1 | 3 | 5.76 | 5.39 | 9.6 | 2.52 | OK |
| 2 | 3 | 5.9 | 5.51 | 10.64 | 1.64 | OK |
| 3 | 3 | 5.69 | 5.74 | 11.11 | 0.19 | OK |
| 4 | 5 | 6.11 | 6.01 | 11.68 | 0.19 | OK |
| 5 | 4 | 5.83 | 5.04 | 9.15 | 1.69 | OK |
| 6 | 4 | 5.84 | 5.25 | 8.48 | 2.37 | OK |
| 7 | 5 | 5.82 | 5.94 | 8.93 | 0.45 | OK |
| 8 | 3 | 6.01 | 5.69 | 9.08 | 1.2 | OK |
| 9 | 5 | 5.94 | 6.61 | 11.47 | 0.79 | OK |
| 10 | 5 | 5.89 | 6.13 | 11.32 | 0.84 | OK |
| 11 | 4 | 5.73 | 4.79 | 8.76 | 2.67 | OK |
| 12 | 5 | 5.75 | 6.16 | 11.31 | 0.83 | OK |
| 13 | 5 | 5.45 | 6.39 | 10.87 | 0.57 | OK, Dip |
| COMP Ink 14 | 4 | 5.77 | 6.46 | 10.73 | 0.13 | OK |
| COMP Ink 15 | 0-4 | 4.98 | 4.71 | 6.66 | 2.39 | Poor |

In Table 9 above, decap performance (Decap) was measured as time in seconds after which good nozzle health is maintained for the first drop after a period of "waiting" time before the nozzle is fired again. This period of time is the "decap time." Decap times considered in this data was ranked from 0 to 5, with higher T values indicating longer decap time, e.g., better decap performance, e.g., 0 indicates worst performance ranging through 5, indicating best relative performance as it relates to decap times. Drop Weight (DW) was measured as an average drop weight in nanograms (ng) across the number of nozzles fired measured using a burst mode or firing. Drop Weight 2,000 (DW 2K) was measured using a 2-drop mode of firing, firing 2,000 drops and then measuring/calculating the average ink composition drop weight in nanograms (ng). Drop Volume (DV) refers to an average velocity of the drop as initially fired from the thermal inkjet nozzles. Decel performance (Decel) refers to the loss in drop velocity after 5 seconds of ink composition firing (Decel data was not collected for all Crosslinker Compositions). Turn On Energy (TOE) Curve refers to the energy used to generate consistent ink composition firing at a drop weight (DW) threshold. Lower energy to achieve higher drop weights tend to be desirable, with DW increasing with increased energy and then flattening out as still more energy is applied.

Table 9 provides the printhead reliability data of the various ink compositions related to the addition of different graft polyurethane copolymer dispersions thereto. As per Table 9, Ink 4, Ink 9, and Ink 10 exhibited the best overall printhead reliability performance, having in many cases acceptable decap, drop weight, drop velocity, and decel. TOE curves of these ink compositions were also considered to be acceptable in their performance profiles, with the exception of COMP Ink 15. As mentioned, COMP Ink 15 does not include the isocyanate-generated amines, and in this specific example, utilized a different diisocyanate (H12MDI, rather than IDPI) in forming the pre-polymer, but it is unclear if either of these changes or a combination of both impacted TOE curve performance.

What is claimed is:

1. A graft polyurethane copolymer dispersion, comprising dispersed polyurethane particles including a graft polyurethane copolymer, wherein the graft polyurethane copolymer consists of:

a polyurethane backbone that is either:

a) a reaction product of i) a polyisocyanate and ii) a polycarbonate polyol; or b) a reaction product of i) a polyisocyanate and ii) a polyether polyol selected from the group consisting of ethylene glycol, polyethylene glycol, propylene glycol, polypropylene glycol, and polyethylene-polypropylene glycol; or c) a reaction product of i) a polyisocyanate and ii) a polyol selected from the group consisting of a polyether polyol having a weight-average molecular weight of from 700 Mw to 3500 Mw and a polycarbonate polyol;

a graft side-chain polymer attached to the polyurethane backbone, wherein the graft side-chain polymer includes poly(meth)acrylic moieties with C1 to C12 alkyl pendant groups, polyalkylene oxide pendant groups, or a combination thereof;

sulfonic acid groups; and isocyanate-generated amines, wherein the graft polyurethane copolymer has a weight-average molecular weight ranging from 10,000 Mw to 150,000 Mw.

2. The graft polyurethane copolymer dispersion of claim 1, wherein the graft side-chain polymer is attached to the polyurethane backbone via a sulfur-containing linking group.

3. The graft polyurethane copolymer dispersion of claim 1, wherein the polyisocyanate includes an isophorone diisocyanate.

4. The graft polyurethane copolymer dispersion of claim 1, wherein the isocyanate-generated amines are generated from an excess of the isocyanate groups provided by the polyisocyanate relative to hydroxyl groups provided by the polyol.

5. An ink composition, comprising:

a pigment;

an ink vehicle including water and organic co-solvent; and from 1 wt % to 15 wt % of polyurethane particles including a graft polyurethane copolymer based on the total weight of the ink composition, the graft polyurethane copolymer consisting of:

a polyurethane backbone that is either:

a) a reaction product of i) a polyisocyanate and ii) a polycarbonate polyol; or b) a reaction product of i) a polyisocyanate and ii) a polyether polyol selected from the group consisting of ethylene glycol, polyethylene glycol, propylene glycol, polypropylene glycol, and polyethylene-polypropylene glycol; or c) a reaction product of i) a polyisocyanate and ii) a polyol selected from the group consisting of a polyether polyol having a weight-average molecular weight of from 700 Mw to 3500 Mw and a polycarbonate polyol;

a graft side-chain polymer attached to the polyurethane backbone, wherein the graft side-chain polymer includes a poly(meth)acrylic moieties with C1 to C12 alkyl pendant groups, polyalkylene oxide pendant groups, or a combination thereof;

sulfonic acid groups; and isocyanate-generated amines, wherein the graft polyurethane copolymer has a weight-average molecular weight ranging from 10,000 Mw to 150,000 Mw.

6. A multi-fluid kit for imaging, comprising:

an ink composition, comprising:

a pigment;

an ink vehicle including water and organic co-solvent; and from 1 wt % to 15 wt % of polyurethane particles based on a total weight of the ink composition, the polyurethane particles including a graft polyurethane copolymer consisting of a polyurethane backbone, a graft side-chain polymer attached to the polyurethane backbone, sulfonic acid groups, and isocyanate-generated amines, wherein the graft side-chain polymer includes a poly(meth)acrylic moieties with C1 to C12 alkyl pendant groups, polyalkylene oxide pendant groups, or a combination thereof, wherein the graft polyurethane copolymer has a weight-average molecular weight ranging from 10,000 Mw to 150,000 Mw, and wherein the polyurethane backbone is either:

a) a reaction product of i) a polyisocyanate and ii) a polycarbonate polyol; or b) a reaction product of i) a polyisocyanate and ii) a polyether polyol selected from the group consisting of ethylene glycol, polyethylene glycol, propylene glycol, polypropylene glycol, and polyethylene-polypropylene glycol; or c) a reaction product of i) a polyisocyanate and ii) a polyol selected from the group consisting of a polyether polyol having a weight-average molecular weight of from 700 Mw to 3500 Mw and a polycarbonate polyol; and a secondary fluid composition.

7. The multi-fluid kit of claim 6, wherein the secondary fluid composition is a second ink composition comprising a second pigment colorant of a different color than the pigment colorant.

8. The multi-fluid kit of claim 6, wherein the secondary fluid also includes the polyurethane particles having the graft polyurethane copolymer.

9. The multi-fluid kit of claim 6, wherein the secondary fluid composition is a fixer composition comprising a cationic compound.

10. A method of printing, comprising:

ejecting an ink composition onto a media substrate, the ink composition including:

a pigment;

an ink vehicle including water and organic co-solvent; and from 1 wt % to 15 wt % of polyurethane particles based on a total weight of the ink composition, the polyurethane particles including a graft polyurethane copolymer consisting of:

a polyurethane backbone that is either:

a) a reaction product of i) a polyisocyanate and ii) a polycarbonate polyol; or b) a reaction product of i) a polyisocyanate and ii) a polyether polyol selected from the group consisting of ethylene glycol, polyethylene glycol, propylene glycol, polypropylene glycol, and polyethylene-polypropylene glycol; or c) a reaction product of i) a polyisocyanate and ii) a polyol selected from the group consisting of a polyether polyol having a weight-average molecular weight of from 700 Mw to 3500 Mw and a polycarbonate polyol;

a graft side-chain polymer attached to the polyurethane backbone, wherein the graft side-chain polymer includes a poly(meth)acrylic moieties with C1 to C12 alkyl pendant groups, polyalkylene oxide pendant groups, or a combination thereof;

sulfonic acid groups; and isocyanate-generated amines, wherein the graft polyurethane copolymer has a weight-average molecular weight ranging from 10,000 Mw to 150,000 Mw.

11. The method of claim 10, further comprising ejecting a fixer composition including a cationic compound on the media substrate prior to ejecting the ink composition thereon.

12. The graft polyurethane copolymer dispersion of claim 1, wherein the graft side-chain polymer includes the polyalkylene oxide pendant groups.

13. The graft polyurethane copolymer dispersion of claim 1, wherein the graft side-chain polymer is the reaction product of thioglycerol, methyl methacrylate, 2-ethylhexyl acrylate, and 2-(2-ethoxyethoxy)ethyl acrylate.

14. The graft polyurethane copolymer dispersion of claim 1, wherein the graft side-chain polymer has a weight average molecular weight ranging from 10,000 Mw to 20,000 Mw.

15. The graft polyurethane copolymer dispersion of claim 1, wherein the graft polyurethane copolymer is self-cross-linkable through the isocyanate-generated amines.

16. The graft polyurethane copolymer dispersion of claim 1, wherein the graft polyurethane copolymer dispersion has an acid number ranging from 39 mg KOH/g to 51.9 mg KOH/g.

17. The graft polyurethane polymer dispersion of claim 1, wherein the polyol has a polymer chain and a hydroxyl group at each end of the polymer chain.

* * * * *